US012592170B2

(12) United States Patent
He

(10) Patent No.: US 12,592,170 B2
(45) Date of Patent: Mar. 31, 2026

(54) DISPLAY CONTROL METHOD AND TERMINAL DEVICE FOR VEHICLES

(71) Applicant: SHENZHEN YINWANG INTELLIGENT TECHNOLOGIES CO., LTD., Shenzhen (CN)

(72) Inventor: Jin He, Shanghai (CN)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/322,865

(22) Filed: May 24, 2023

(65) Prior Publication Data

US 2023/0298492 A1 Sep. 21, 2023

Related U.S. Application Data

(63) Continuation of application No. PCT/CN2020/131097, filed on Nov. 24, 2020.

(51) Int. Cl.
*G09G 3/00* (2006.01)
*B60K 35/25* (2024.01)
(Continued)

(52) U.S. Cl.
CPC ............. *G09G 3/002* (2013.01); *B60K 35/25* (2024.01); *B60K 35/60* (2024.01); *B60K 35/81* (2024.01); *B60Q 3/60* (2017.02); *B60Q 3/74* (2017.02); *B60Q 3/80* (2017.02); *G09G 2354/00* (2013.01); *G09G 2370/16* (2013.01); *G09G 2380/10* (2013.01)

(58) Field of Classification Search
CPC .............. G09G 3/002; G09G 2354/00; G09G 2380/10; G09G 2370/16; B60Q 3/60; B60Q 3/74; B60Q 3/80
See application file for complete search history.

(56) References Cited

U.S. PATENT DOCUMENTS

2009/0046258 A1* 2/2009 Schnuckle ............. G03B 21/14
                                                            353/94
2009/0140993 A1* 6/2009 Han ........................ B60K 35/10
                                                            345/173
(Continued)

FOREIGN PATENT DOCUMENTS

| CN | 103777443 A | 5/2014 |
| CN | 111208898 A | 5/2020 |
| CN | 112703128 A | 4/2021 |

OTHER PUBLICATIONS

International Search Report and Written Opinion in International Appln. No. PCT/CN2020/131097, mailed on Aug. 18, 2021, 19 pages (with English translation).
(Continued)

*Primary Examiner* — Kwang-Su Yang
(74) *Attorney, Agent, or Firm* — Fish & Richardson P.C.

(57) ABSTRACT

This application provides example display control methods, media, and terminal devices. One example display control method is applied to a vehicle. At least one projection device is installed in the vehicle. The example display control method includes receiving, by a terminal device, a display instruction. In response to the display instruction, the at least one projection device is controlled to perform projection in the vehicle, where an image projected by the at least one projection device is displayed in the vehicle.

18 Claims, 11 Drawing Sheets

(a)

(b)

(51) Int. Cl.
    *B60K 35/60*       (2024.01)
    *B60K 35/81*       (2024.01)
    *B60Q 3/60*        (2017.01)
    *B60Q 3/74*        (2017.01)
    *B60Q 3/80*        (2017.01)

(56)                References Cited

U.S. PATENT DOCUMENTS

| | | | |
|---|---|---|---|
| 2011/0084891 A1* | 4/2011 | Ozaki | B60R 11/0258 |
| | | | 345/1.1 |
| 2015/0352956 A1* | 12/2015 | Miuchi | B62D 15/0295 |
| | | | 701/41 |
| 2016/0355133 A1* | 12/2016 | Kim | G06F 3/04883 |
| 2018/0352204 A1* | 12/2018 | Fujita | H04N 9/3188 |
| 2019/0017681 A1* | 1/2019 | Hoshino | G02F 1/29 |
| 2019/0299784 A1* | 10/2019 | Nakano | G02B 27/0101 |
| 2021/0150772 A1* | 5/2021 | Yasui | B60K 35/10 |

OTHER PUBLICATIONS

Extended European Search Report in European Appln No. 20962666.
2, dated Nov. 15, 2023, 7 pages.

\* cited by examiner

Terminal device 100

| A terminal device receives a display instruction |
| --- |

| The terminal device sends a projection start instruction to at least one projection device in response to the display instruction, to control the at least one projection device to project an image in a vehicle |
| --- |

(a)

(b)

DISPLAY CONTROL METHOD AND TERMINAL DEVICE FOR VEHICLES

CROSS-REFERENCE TO RELATED APPLICATIONS

This application is a continuation of International Application No. PCT/CN2020/131097, filed on Nov. 24, 2020, the disclosure of which is hereby incorporated by reference in its entirety.

TECHNICAL FIELD

Embodiments of this application relate to the field of terminal technologies, and in particular, to a display control method and a terminal device.

BACKGROUND

With the diversification of social development, people are increasingly pursuing personalization in daily life, for example, personalized dressing and accessories. Generally, people are equipped with a plurality of sets of different accessories, and then implement personalization by changing the accessories at different stages. For example, for interior accessories of a household vehicle, people usually prepare a plurality of sets of seat covers of different colors and patterns, and then change an interior visual effect by changing the seat covers of the vehicle, to implement personalization of the interior accessories of the vehicle. However, it is costly, with inconvenience brought by the change of the seat covers.

SUMMARY

Embodiments of this application provide a display control method and a terminal device, to meet a requirement for personalized visual effects in a vehicle through technical means.

In embodiments of this application, a visual display effect in a cabin of a vehicle is used as an example for description. At least one projection device is installed in the cabin of the vehicle, and the terminal device is communicatively connected to the at least one projection device.

According to a first aspect, an embodiment of this application provides a display control method. The method includes: A terminal device receives a display instruction. The terminal device controls, in response to the display instruction, at least one projection device to perform projection in a vehicle, so that the vehicle displays an image projected by the at least one projection device.

The terminal device may be an electronic device that has a wireless communication function and that supports a vehicle control function, for example, a mobile phone, a tablet computer, or an in-vehicle device. Further, in a process in which a user uses a vehicle, the terminal device may receive a signal generated when the user triggers the vehicle, and the terminal device may control, based on different information, the at least one projection device to perform projection or turn off projection. For example, after receiving a vehicle door opening signal or a vehicle door unlocking signal, the terminal device may control the at least one projection device to perform projection in the vehicle, so that the vehicle displays and presents a visual effect of the projected image. In embodiments of this application, signals that trigger the terminal device to control the projection device to perform projection are collectively referred to as a display instruction.

In this implementation, the terminal device controls the projection device to project an image in a cabin of the vehicle, to implement personalized display in the vehicle. In this way, a personalized visual effect can be presented to a user, and the user can flexibly select an image to be projected from a large image library, so that a display effect of the vehicle has high scalability, and user experience is optimized.

In a possible implementation, after the terminal device controls, in response to the display instruction, at least one projection device to perform projection in a vehicle, the method further includes: The terminal device receives a turn-off instruction, where a photographing device indicated by the turn-off instruction includes a first projection device, and the first projection device is any projection device of the at least one projection device. The terminal device controls the first projection device to turn off projection. Corresponding to controlling the projection device to perform projection, in some other implementation scenarios, the terminal device may control the projection device to turn off projection. For example, after receiving a vehicle door closing signal or a vehicle door locking signal, the terminal device may control to turn off some or all of the at least one projection device. In embodiments of this application, signals that trigger the terminal device to control to turn off the projection device are collectively referred to as a turn-off instruction. In this way, the terminal device can flexibly control, based on a usage scenario of the user, the projection device in the vehicle to turn off display, so that the user can use the vehicle conveniently, and user experience can be further optimized.

In a possible implementation, the display instruction includes a vehicle door unlocking signal of the vehicle and a vehicle door opening signal of the vehicle.

In a possible implementation, that the terminal device controls the at least one projection device to perform projection in the vehicle includes: The terminal device controls each of the at least one projection device to project a first image. In some embodiments, the terminal device may control the at least one projection device to always project a same image.

In a possible implementation, the terminal device starts timing at a moment at which the terminal device controls the at least one projection device to project the first image; and after the timing reaches first duration, the terminal device controls the at least one projection device to project a second image. In embodiments of this application, "after the timing reaches first duration" means that at a moment at which the timing reaches the first duration, the terminal device immediately generates an instruction for controlling the at least one projection device to switch an image, and sends the instruction to the at least one projection device, to control the at least one projection device to switch projected images at intervals of the first duration. Because a moment at which the terminal device generates the instruction and sends the instruction is after "the timing reaches first duration", embodiments of this application are described as such.

In a possible implementation, that the terminal device controls the at least one projection device to perform projection in the vehicle includes: The terminal device controls the first projection device to project a third image, and controls a second projection device to project a fourth image, where both the first projection device and the second projection device belong to the at least one projection device. In some embodiments, the terminal device may control the at least one projection device to project different images, so that a visual effect in the vehicle can be enriched, and user experience can be improved.

In a possible implementation, the terminal device starts timing at a moment at which the terminal device controls the first projection device to project the third image and controls the second projection device to project the fourth image; and after the timing reaches second duration, the terminal device controls the first projection device to project a fifth image, and controls the second projection device to project a sixth image. An actual implementation process of "after the timing reaches second duration" is similar to that of "after the timing reaches first duration". Details are not described herein again. The second duration may be the same as or different from the first duration. In this embodiment, the terminal device may control the at least one projection device to separately switch projected images at intervals of the second duration, so that a visual effect in the vehicle can be enriched, and user experience can be improved.

In a possible implementation, when the turn-off instruction is a first turn-off instruction, the turn-off instruction includes a vehicle door locking signal of the vehicle; or when the turn-off instruction is a second turn-off instruction, the turn-off instruction includes a first sensing signal, the first sensing signal corresponds to the first projection device, the first sensing signal indicates a user to sit on a first seat of the vehicle, and the first projection device performs projection on the first seat. Through this implementation, the terminal device can flexibly control, based on a usage scenario of the user, the projection device in the vehicle to turn off display, so that the user can use the vehicle conveniently, and user experience can be further optimized.

In a possible implementation, that the terminal device controls the first projection device to turn off projection includes: When the turn-off instruction is the first turn-off instruction, the terminal device controls, the at least one projection device to turn off projection completely; or when the turn-off instruction is the second turn-off instruction, the terminal device controls the first projection device to turn off projection. Through this implementation, a mobile phone can flexibly control, based on a usage scenario of the user, the projection device in the vehicle to turn off display, so that the user can use the vehicle conveniently, and user experience can be further optimized.

In a possible implementation, that the terminal device controls the first projection device to turn off projection further includes: starting timing at a moment at which the terminal device receives the turn-off instruction; and when the timing reaches third duration, controlling the first projection device to turn off projection. Through this implementation, a mobile phone can flexibly control, based on a usage scenario of the user, the projection device in the vehicle to turn off display, so that the user can use the vehicle conveniently, and user experience can be further optimized.

According to a second aspect, an embodiment of this application provides a terminal device. The terminal device has a function of implementing behavior of the terminal device in the foregoing method. The function may be implemented by hardware, or may be implemented by hardware by executing corresponding software. The hardware or software includes one or more modules corresponding to the foregoing function. In a possible design, a structure of the terminal device includes a processor and a transceiver. The processor is configured to enable the terminal device to perform a corresponding function in the foregoing method. The transceiver is configured to implement communication between the terminal device and a vehicle and between the terminal device and a projection device. The terminal device may further include a memory. The memory is configured to be coupled to the processor, and the memory stores program instructions and data that are necessary for the terminal device.

According to a third aspect, an embodiment of this application further provides a terminal device. The terminal device includes at least one processor and an interface. The interface is configured to receive code instructions and transmit the code instructions to the at least one processor. The at least one processor runs the code instructions and transmits control instructions to a projection device through the interface, to implement some or all steps of the display control method in the first aspect and the possible implementations of the first aspect.

According to a fourth aspect, an embodiment of this application provides a computer-readable storage medium. The computer-readable storage medium stores instructions. When the instructions run on a computer, some or all steps of the display control method in the first aspect and the possible implementations of the first aspect are implemented.

According to a fifth aspect, an embodiment of this application provides a computer program product including instructions. When the instructions are run on a computer or a processor, the computer or the processor is enabled to perform some or all steps of the display control method in the first aspect and the possible implementations of the first aspect.

BRIEF DESCRIPTION OF DRAWINGS

To describe technical solutions in embodiments of this application more clearly, the following briefly describes the accompanying drawings for describing embodiments. Clearly, persons of ordinary skill in the art may derive other drawings from these accompanying drawings without creative efforts.

FIG. 4B-1 is a schematic diagram of a second example display interface of a mobile phone according to an embodiment of this application;

FIG. 4B-2 is a schematic diagram of a third example display interface of a mobile phone according to an embodiment of this application;

FIG. 4E-1 is a schematic diagram of a sixth example display interface of a mobile phone according to an embodiment of this application;

FIG. 4E-2 is a schematic diagram of a seventh example display interface of a mobile phone according to an embodiment of this application;

DESCRIPTION OF EMBODIMENTS

The following clearly describes the technical solutions in embodiments of this application with reference to the accompanying drawings in embodiments of this application.

Terms used in the following embodiments of this application are merely intended to describe specific embodiments, but are not intended to limit embodiments of this application. The terms "one", "a" and "this" of singular forms used in this specification and the appended claims of embodiments of this application are also intended to include plural forms, unless otherwise specified in the context clearly. It is also to be understood that although the terms first, second, and the like may be used to describe a class of objects in the following embodiments, the objects should not be limited to these terms. The terms are merely used to distinguish between specific objects of this class of objects. For example, in the following embodiments, terms such as first and second may be used to describe projection devices, but the projection devices should not be limited to these terms. These terms are merely used to differentiate between different projection devices. The same applies to other classes of objects that may be described by using the terms first, second, and the like in the following embodiments. Details are not described herein again.

An embodiment of this application provides a display control method. A terminal device controls a projection device to project an image to a seat or the like in a vehicle, so that the seat or the like in the vehicle displays a color and a pattern corresponding to the image. This presents a personalized visual effect to a user.

A terminal device, a user interface (UI) used for the terminal device, and embodiments for using the terminal device are described below.

The terminal device in embodiments of this application may be an electronic device including a wireless communication module, like a mobile phone, a tablet computer, an in-vehicle device, a wearable device (for example, a watch, a band, or a helmet), an augmented reality (AR)/virtual reality (VR) device, a notebook computer, an ultra-mobile personal computer (UMPC), a netbook, a personal digital assistant (PDA), or a smart home device (for example, a smart television). It may be understood that a specific type of the terminal device is not limited in embodiments of this application. The terminal device may be a device with iOS®, Android®, Microsoft®, or another operating system.

Figures 1, 2:
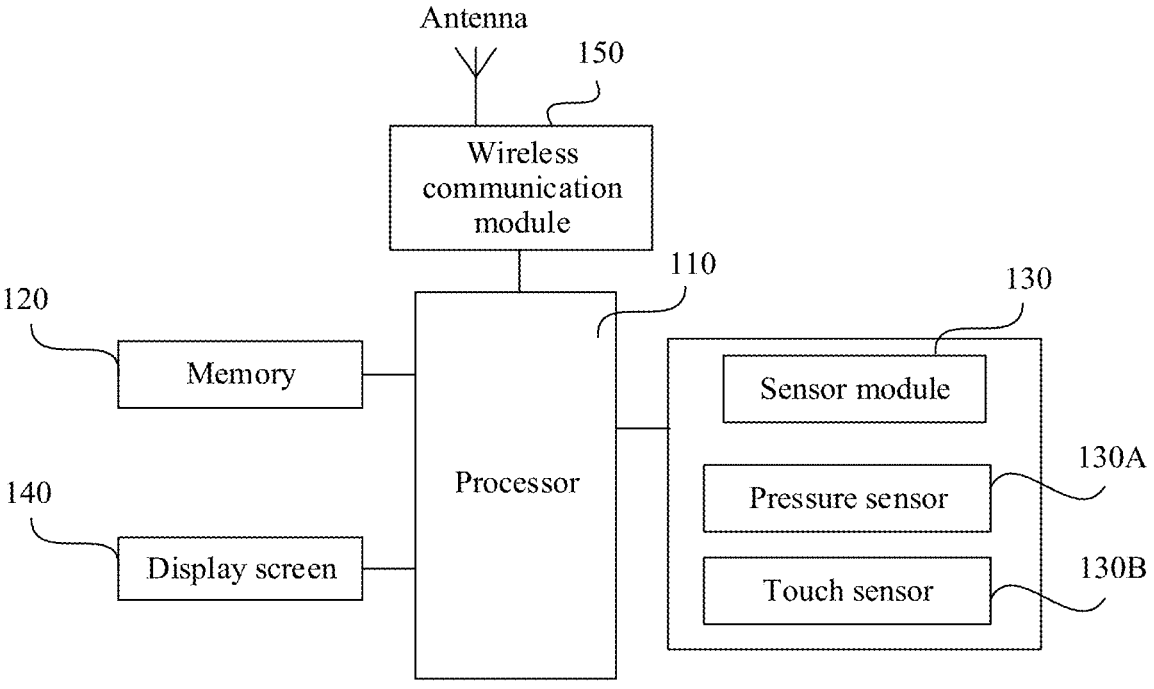
FIG. 1 is a schematic diagram of an example architecture of a terminal device 100 according to an embodiment of this application.
FIG. 2 is a schematic diagram of an example method of a display control method according to an embodiment of this application.

FIG. 1 is a schematic diagram of an example architecture of a terminal device 100. The terminal device 100 may include a processor 110, a memory 120, a sensor module 130, a display 140, an antenna, a wireless communication module 150, and the like.

It can be understood that, a structure illustrated in this embodiment of this application does not constitute a specific limitation on the terminal device 100. In some other embodiments of this application, the terminal device 100 may include more or fewer components than those shown in the figure, or combine some components, or split some components, or have different component arrangements. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, a neural-network processing unit (NPU), and/or the like. Different processing units may be independent components, or may be integrated into one or more processors. In some embodiments, the terminal device 100 may alternatively include one or more processors 110.

The controller may be a nerve center and a command center of the terminal device 100. The controller may generate an operation control signal based on instruction operation code and a time sequence signal, to complete control of a display instruction.

A memory may be further disposed in the processor 110, and is configured to store instructions and data. In some embodiments, the memory in the processor 110 is a cache memory. The memory may store instructions or data that has been used or cyclically used by the processor 110. If the processor 110 needs to use the instructions or the data again, the processor may directly invoke the instructions or the data from the memory. This avoids repeated access and reduces a waiting time of the processor 110, so that efficiency of the terminal device 100 is improved.

In some embodiments, the processor 110 may include one or more interfaces. The interface may include an inter-integrated circuit (I2C) interface, a universal asynchronous receiver/transmitter (UART) interface, a mobile industry processor interface (MIPI), a universal serial bus (USB) interface, and the like.

The I2C interface is a two-way synchronization serial bus, and includes one serial data line (SDA) and one serial clock line (SCL). In some embodiments, the processor 110 may include a plurality of groups of I2C buses. The processor 110 may be coupled to a touch sensor 130B by different I2C bus interfaces, so that the processor 110 communicates with the touch sensor 130B through the I2C bus interfaces, to implement a touch function of the terminal device 100.

The UART interface is a universal serial data bus, and is configured to perform asynchronous communication. The bus may be a two-way communication bus. The bus converts to-be-transmitted data between serial communication and parallel communication. In some embodiments, the UART interface is usually configured to connect the processor 110 to the wireless communication module 150. For example, the processor 110 communicates with a Bluetooth module in the wireless communication module 150 through the UART interface, to implement a Bluetooth function, and further establish a connection between the terminal device 100 and a projection device and transmit information.

The MIPI interface may be configured to connect a peripheral component like the processor 110 and the display 140. The MIPI interface includes a display serial interface (DSI) and the like. In some embodiments, the processor 110 communicates with the display 140 through the DSI interface, to implement a display function of the terminal device 100.

In some other embodiments, the processor 110 may further include an inter-integrated circuit sound (I2S) interface, a pulse code modulation (PCM) interface, a general-purpose input/output (GPIO) interface, and the like. Details are not described herein.

It can be understood that an interface connection relationship between the modules illustrated in this embodiment of this application is merely an example for description, and does not constitute a limitation on the structure of the terminal device 100. In some other embodiments, the terminal device 100 may alternatively use an interface connection manner different from that in the foregoing embodiment, or use a combination of a plurality of interface connection manners.

The terminal device 100 implements a wireless communication function through an antenna, a wireless communication module 150, a modem processor, a baseband processor, and the like.

The antenna is configured to transmit an electromagnetic wave signal to the projection device, and receive an electromagnetic wave signal from the projection device. Each antenna in the terminal device 100 may be configured to cover one or more communication frequency bands. Different antennas may be further multiplexed, to increase antenna utilization. For example, the antenna may be multiplexed as a diversity antenna in a wireless local area network. In some other embodiments, the antennas may be used in combination with a tuning switch.

The modem processor may include a modulator and a demodulator. The modulator is configured to modulate a to-be-sent low-frequency baseband signal into a medium-high frequency signal. The demodulator is configured to demodulate the received electromagnetic wave signal into a low-frequency baseband signal. Then, the demodulator transmits the low frequency baseband signal obtained through demodulation to the baseband processor for processing. After being processed by the baseband processor, the low frequency baseband signal is transmitted to the application processor. The application processor may display, for example, an operation interface of the APP, a to-be-projected image, and the like through the display 140. In some embodiments, the modem processor may be an independent device. In some other embodiments, the modem processor may be independent of the processor 110, and is disposed in the same component as another function module.

The wireless communication module 150 may provide a solution that includes wireless communication like a wireless local area network (WLAN) (for example, a wireless fidelity (Wi-Fi) network), Bluetooth (BT), a global navigation satellite system (GNSS), frequency modulation (FM), a near field communication (NFC) technology, and an infrared (IR) technology and that is applied to the terminal device 100. The wireless communication module 150 may be one or more components integrating at least one communication processor module. The wireless communication module 150 receives an electromagnetic wave through an antenna, performs frequency modulation and filtering processing on the electromagnetic wave signal, and sends the processed signal to the processor 110. The wireless communication module 150 may further receive a to-be-sent signal from the processor 110, perform frequency modulation and amplification on the to-be-sent signal, and convert the signal into an electromagnetic wave through an antenna and radiate the signal.

In some embodiments, the antenna of the terminal device 100 is coupled to the wireless communication module 150, so that the terminal device 100 may communicate with a network and another device (for example, a projection device) through a wireless communication technology, so that the terminal device 100 controls the projection device to perform a projection operation.

The terminal device 100 implements a display function through a GPU, the display 140, the application processor, and the like. The GPU is a microprocessor for image processing, and is connected to the display 140 and the application processor. The GPU is configured to: perform mathematical and geometric computation, and render an image. The processor 110 may include one or more GPUs, and the one or more GPUs execute program instructions to generate or change an interface display effect of the terminal device 100. In embodiments of this application, the display 140 may include a display and a touch component. The display is configured to output display content to a user, for example, a setting operation interface of a to-be-projected image of the terminal device 100. The touch component is configured to receive an operation instruction entered by the user on the display 140.

The display 140 includes a display panel. The display panel may be a liquid crystal display (LCD), an organic light-emitting diode (OLED), an active-matrix organic light emitting diode (AMOLED), a flexible light-emitting diode (FLED), a mini-LED, a micro-LED, a micro-OLED, a quantum dot light emitting diode (QLED), or the like.

In some embodiments of this application, when the display panel is made of an OLED, an AMOLED, an FLED or the like, the display 140 may be bent. That the display 140 may be folded means that the display may be folded to any angle at any part and may be maintained at the angle. For example, the display 140 may be folded left and right in the middle, or may be folded up and down in the middle.

The memory 120 may be configured to store one or more computer programs, and the one or more computer programs include instructions. The processor 110 may run the instructions stored in the memory 120, so that the terminal device 100 performs the display control method provided in some embodiments of this application, various functional applications, data processing, and the like. The memory 120 may include a program storage area and a data storage area. The program storage area may store an operating system. The program storage area may further store one or more applications (such as HiCar), and the like. The data storage area may store data (for example, a to-be-projected image and duration of performing projection by the projection device) created in a process of using the terminal device 100. In addition, the memory 120 may include a high-speed random access memory, and may further include a non-volatile memory, for example, at least one magnetic disk storage device, a flash memory device, or a universal flash storage (UFS).

The sensor module 130 may include a pressure sensor 130A and the touch sensor 130B.

The pressure sensor 130A is configured to sense a pressure signal, and can convert the pressure signal into an electrical signal. In some embodiments, the pressure sensor 130A may be disposed on the display 140. There are various types of pressure sensors 130A such as a resistive pressure sensor, an inductive pressure sensor, and a capacitive pressure sensor. The capacitive pressure sensor may include at least two parallel plates made of conductive materials. When a force is applied to the pressure sensor 130A, capacitance between electrodes changes. The terminal device 100 determines pressure strength based on a capacitance change. When a touch operation is performed on the display 140, the terminal device 100 detects intensity of the touch operation through the pressure sensor 130A. The terminal device 100 may also calculate a touch location based on a detection signal of the pressure sensor 130A.

The touch sensor 130B may also be referred to as a touch panel or a touch-sensitive surface. The touch sensor 130B may be disposed on the display 140, and the touch sensor 130B and the display 140 constitute a touchscreen, which is also referred to as a "touchscreen". The touch sensor 130B is configured to detect a touch operation performed on or near the touch sensor. The touch sensor 130B may transfer a detected touch operation to the processor 110. The terminal device 100 may determine, based on the detection signal of the touch sensor 130B, an operation instruction entered by the user, and implements functions such as determining the to-be-projected image in response to the corresponding operation instruction.

In some other embodiments, the sensor module 130 may further include a gyroscope sensor, an acceleration sensor, a magnetic sensor, a barometric pressure sensor, a distance sensor, an optical proximity sensor, a fingerprint sensor, a temperature sensor, an ambient light sensor, a bone conduction sensor, and the like. Details are not described herein again.

In some other embodiments, when the terminal device 100 is implemented as an in-vehicle device, the terminal device 100 may further include a projection manager. The projection manager may generate a projection start instruction based on projection information set by the user, and then trigger, based on the projection start instruction, the projection device to perform a projection operation according to the setting of the user.

An example application scenario in embodiments of this application includes a vehicle, at least one projection device is installed in a cabin of the vehicle, and the terminal device 100 is communicatively connected to the at least one projection device.

In an actual implementation, a principle that all seats in the vehicle can be covered by a projection field of view of the projection device is used. Based on this, a quantity of projection devices installed in the cabin of the vehicle is related to a size of the cabin of the vehicle. For example, if the cabin of the vehicle has a size of four seats (that is, a total of four seats), only one projection device may be configured in the cabin of the vehicle. In another example, if the cabin of the vehicle has a size of eight seats (that is, a total of eight seats), only four projection devices may be configured in the cabin of the vehicle. In addition, a location of the projection device in the cabin of the vehicle is associated with the quantity of projection devices. For example, in a scenario in which one projection device is configured in the cabin of the vehicle, the projection device may be installed at a position on a top of a vehicle corresponding to a driving seat of the vehicle. In another example, in a scenario in which four projection devices are disposed in the cabin of the vehicle, the four projection devices may be separately installed at positions at four corners of a top of the vehicle.

In some embodiments, each of the at least one projection device may rotate, to implement a function of projection from different angles.

In some embodiments, the at least one projection device may exist as a part of components of the vehicle. In some other embodiments, the at least one projection device may be a component independent of the vehicle. In this embodiment, the at least one projection device may establish a connection to the vehicle by a hot-swap interface (for example, a USB interface).

Based on this, as shown in FIG. 2, a display control method provided in an embodiment of this application includes: A terminal device 100 receives a display instruction; and then the terminal device 100 sends a projection start instruction to at least one projection device in response to the display instruction, to control the at least one projection device to project an image in a vehicle, so that the vehicle displays the projected image, thereby presenting a visual effect corresponding to the image.

It can be learned that in this implementation, a projection device is installed in the vehicle, and the terminal device controls the projection device to project an image to a seat and the like of the vehicle, to implement personalized display in the vehicle. In this way, a personalized visual effect can be presented to a user, and the user can flexibly select an image to be projected from a large image library, so that a display effect of the vehicle has high scalability, and user experience is optimized.

In some embodiments, the terminal device 100 controls each of the at least one projection device to project a first image and always project the first image during projection. In some other embodiments, the terminal device 100 starts timing while controlling the at least one projection device to project the first image; and after the timing reaches first duration, the terminal device 100 controls the at least one projection device to project a second image. In some implementations, the terminal device 100 may repeat a timing operation while controlling the at least one projection device to project the second image; and after the timing reaches the first duration, the terminal device 100 controls the at least one projection device to project another image. In some other embodiments, the terminal device 100 controls a first projection device in the at least one projection device to project a third image, and controls a second projection device in the at least one projection device to project a fourth image. In some other embodiments, the terminal device 100 starts timing while controlling the first projection device in the at least one projection device to project the third image and the second projection device to project the fourth image. After the timing reaches second duration, the terminal device 100 controls the first projection device to project a fifth image and the second projection device to project a sixth image. In some possible implementations, the terminal device 100 may repeat a timing operation while the first projection device projects the fifth image and the second projection device projects the sixth image, and after the timing reaches the second duration, the terminal device 100 controls the first projection device and the second projection device to separately project other images.

In some embodiments, the third image and the fourth image are images with utterly different colors, patterns, and/or styles. For example, the third image is a landscape image, and the fourth image is a pet image. In some other embodiments, content of the third image and content of the fourth image belong to a same theme. Content presented by images belonging to a same theme all represents an intention associated with the theme. Based on this, image content and patterns belonging to a same theme may be different, but colors, styles, and the like may be the same. For example, content of the third image and content of the fourth image belong to a theme "late autumn", the third image presents, for example, maple trees in autumn, and the fourth image presents, for example, fallen leaves of the maple trees. In some other embodiments, content of the third image, the fourth image, the fifth image, and the sixth image belongs to a same intellectual property (IP). For example, the third image, the fourth image, the fifth image, and the sixth image are different skins of a same mobile phone game. For another example, the third image, the fourth image, the fifth image, and the sixth image are different stills of a same TV series. Details are not described herein again.

In addition, the first duration and the second duration may be flexibly set based on an actual requirement. In a possible implementation, the first duration is, for example, 3 seconds (s), and the second duration is, for example, 5 s.

Further, in some other embodiments, after controlling the at least one projection device to project an image in the vehicle, the terminal device 100 may further receive a turn-off instruction, where a photographing device indicated by the turn-off instruction includes the first projection device, and the first projection device is any projection device of the at least one projection device. Further, the terminal device 100 sends a projection turn-off instruction to the first projection device, to control the first projection device to turn off projection.

In some embodiments, the turn-off instruction is implemented as a first turn-off instruction, where the first turn-off instruction may indicate to turn off projection of all projection devices. In some other embodiments, the turn-off instruction is implemented as a second turn-off instruction, and the second turn-off instruction may indicate to turn off projection of some projection devices in the at least one projection device, for example, turn off projection of the first projection device.

For example, after the first projection device is turned off, the terminal device 100 receives a start instruction entered by the user, where the start instruction indicates the first projection device. Further, the terminal device 100 sends the projection start instruction to the first projection device, to control the first projection device to perform projection in the vehicle.

It should be noted that, corresponding to different embodiments of this application, the foregoing display instruction may be presented in different implementations. In some embodiments, the terminal device 100 may receive an instruction for setting a to-be-projected image by the user. After receiving the instruction that is entered by the user and that is for completing setting, the terminal device 100 may send the projection start instruction to the at least one projection device. Based on this, in this embodiment, the display instruction is implemented as the instruction for completing setting (as shown in the embodiment shown in FIG. 4E-2). In some other embodiments, after receiving a vehicle door unlocking signal, the terminal device 100 sends the projection start instruction to the at least one projection device. Correspondingly, in this embodiment, the display instruction is implemented as the vehicle door unlocking signal. In some other embodiments, after receiving a vehicle door opening signal, the terminal device 100 sends the projection start instruction to the at least one projection device. Correspondingly, in this embodiment, the display instruction is implemented as the vehicle door opening signal.

Corresponding to different embodiments of this application, the foregoing turn-off instruction may be presented in different implementations. In some embodiments, after receiving the vehicle door locking signal, the terminal device 100 sends the projection turn-off instruction to the projection device. In this embodiment, the turn-off instruction is implemented as the vehicle door locking signal. The vehicle door locking signal is, for example, the foregoing first turn-off instruction. Correspondingly, the terminal device 100 sends the projection turn-off instruction to each projection device in the at least one projection device, to trigger the at least one projection device to stop projection. In other embodiments, after receiving the first sensing signal, the terminal device 100 sends the projection turn-off instruction to the projection device. The first sensing signal indicates the user to sit on a first seat. In this embodiment, the turn-off instruction is implemented as the first sensing signal. The first sensing signal is, for example, the foregoing second turn-off instruction. The second turn-off instruction indicates, for example, the first projection device. The first projection device is, for example, a projection device that performs projection on the first seat. Further, the terminal device 100 sends the projection turn-off instruction to the first projection device, to trigger the first projection device to stop projection (as shown in the embodiment shown in FIG. 6).

It may be understood that the foregoing implementation scenarios and implementations of instructions in each implementation scenario are all examples for description, and do not constitute a limitation on embodiments of this application. In an actual implementation, the foregoing instruction may alternatively be another implementation form in another implementation scenario. For example, the turn-off instruction may be implemented as a tap operation instruction of the user received by the terminal device 100. Details are not described herein again.

In some other embodiments, after receiving any one of the foregoing turn-off instructions, the terminal device 100 may start timing, and the terminal device 100 sends the projection turn-off instruction to the projection device after duration of the timing reaches third duration.

The third duration may be flexibly set based on an actual requirement. In a possible implementation, the third duration is, for example, 8 seconds (s).

It should be noted that, in actual execution, the foregoing "timing" operation may be counting up or may be counting down. The counting up is a timing manner in which a timer is incremented by 1 every 1 s starting from 0 until the duration of the timing reaches preset duration. The counting down is a timing manner in which the timer is decremented by 1 every is from preset duration until the duration of the timing reaches 0.

Before performing the foregoing display control method, the terminal device 100 may download a to-be-projected image from a cloud server, receive a setting instruction of the user, and determine the to-be-projected image, the first duration, the second duration, the third duration, and the like.

The terminal device 100 may receive the setting instruction of the user through a UI. The UI in embodiments of this application is a medium interface for interaction and information exchange between an application or an operating system and the user, and implements conversion between an internal form of information and a form acceptable to the user. A user interface of an application is source code written in a specific computer language, for example, Java or an extensible markup language (extensible markup language, XML). The source code of the interface is parsed and rendered on the terminal device, and is finally presented as user-recognizable content, for example, a video, a picture, a text, or a control like a button. The control, also referred to as a widget, is a basic element on the user interface. Typical controls include a toolbar, a menu bar, a text box, a button, a scrollbar, a picture, and a text. An attribute and content of a control on the interface are defined by using a tag or a node. For example, the control included in the interface is defined in the XML by using a node like <Textview>, <ImgView>, or <VideoView>. One node corresponds to one control or one attribute on the interface. After being parsed and rendered, the node is presented as user-visible content. In addition, interfaces of many applications such as a hybrid application usually further include a web page. The web page, also referred to as a page, may be understood as a special control embedded in an interface of an application. The web page is source code written in a specific computer language, for example, a hypertext markup language (HTML), cascading style sheets (CSS), or JavaScript (JS). The web page source code may be loaded and displayed as user-recognizable content by a browser or a web page display component with a function similar to a function of the browser. Specific content included in the web page is also defined by using a tag or a node in the web page source code. For example, an element and an attribute of the web page are defined in the HTML by using <p>, <img>, <video>, or <canvas>.

The user interface is usually represented in a form of a graphical user interface (GUI), and is a user interface that is related to a computer operation and that is displayed in a graphic manner. The user interface may be an interface element displayed on a display of an electronic device, for example, an icon, a window, or a control. The control may include a visual interface element, for example, an icon, a button, a menu, a tab, a text box, a dialog box, a status bar, a navigation bar, or a widget.

For ease of understanding, in the following embodiments of this application, the display control method provided in embodiments of this application is described in detail with reference to the accompanying drawings by using an example in which a mobile phone having the structure shown in FIG. 1 is used as a terminal device and a vehicle in which four projection devices are installed.

Figure 3A:
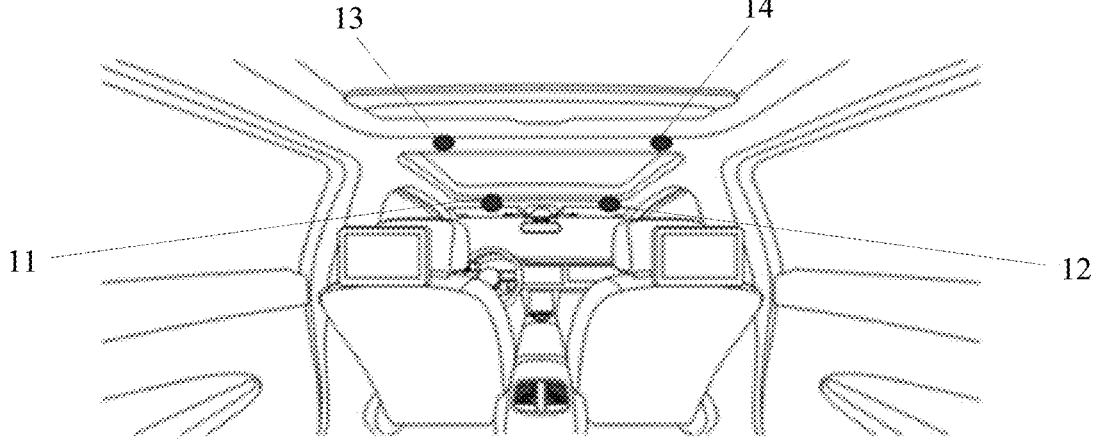
FIG. 3A is a schematic diagram of an example structure of a cabin of a vehicle according to an embodiment of this application.
Figure 3B:
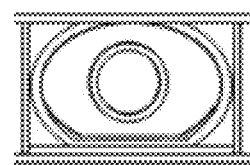
FIG. 3B is a schematic diagram of an example appearance of a projection device according to an embodiment of this application.

For example, as shown in FIG. 3A, the vehicle in this embodiment is, for example, a vehicle including four seats. A projection device 11, a projection device 12, a projection device 13, and a projection device 14 are installed in a cabin of the vehicle. The projection device 11, the projection device 12, the projection device 13, and the projection device 14 are respectively installed at positions at four corners on a top of the vehicle. Any one of the projection device 11, the projection device 12, the projection device 13, and the projection device 14 may be shown in FIG. 3B.

It may be understood that FIG. 3A is merely an example for description, and constitutes no limitation on embodiments of this application. In some other embodiments, the vehicle may alternatively be a vehicle with another quantity of seats, and a quantity of projection devices installed in the vehicle may be another quantity. This is not limited here.

Figure 3C:
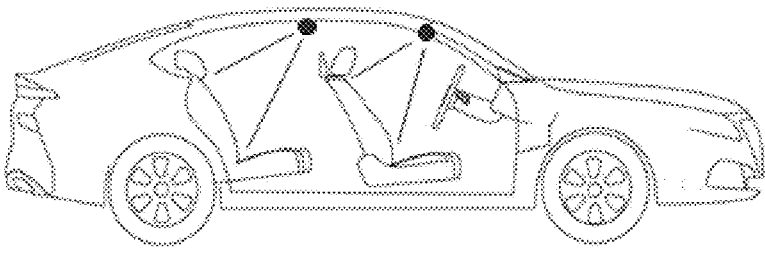
FIG. 3C is a schematic diagram of an example of a projection field of view of a projection device according to an embodiment of this application.

In this embodiment, each of the projection device 11, the projection device 12, the projection device 13, and the projection device 14 may perform projection on one seat of the vehicle. In an actual implementation, each projection device may perform projection on a seat on a same side as the projection device. For example, the projection device 11 may perform projection on a seat in a driving position, the projection device 12 may perform projection on a seat in a front passenger position, the projection device 13 may perform projection on a seat behind the driving position, and the projection device 14 may perform projection on a seat behind the front passenger position. A projection angle of the projection device is based on a principle of projecting an image to a center of a seat. Based on this, a relationship between a field of view range of the projection device and a seat to which projection is performed may be shown in FIG. 3C.

A vehicle control system APP, for example, APP "HiCar", may be installed on the mobile phone. Then, the mobile phone may establish a network connection to an in-vehicle infotainment system, so that the mobile phone may send a control command to a projection device in the vehicle in response to an operation instruction entered by a user by using the APP, to implement the display control method in embodiments of this application.

It is to be noted that, after establishing a network connection to the in-vehicle infotainment system of the vehicle, the APP can detect a quantity of projection devices included in the vehicle. Therefore, the APP may allocate a number to each projection device to identify each projection device. For example, the APP may allocate numbers to the projection devices in sequence from the head of the vehicle to the rear of the vehicle and from left to right. For example, the projection device 11 is numbered "Projector 1", the projection device 12 is numbered "Projector 2", the projection device 13 is numbered "Projector 3", and the projection device 14 is numbered "Projector 4".

In embodiments of this application, an actual implementation process may include the following three phases: a presetting phase, a display phase, and a display stop phase. An embodiment of a display control method is described below with reference to the three phases.

Presetting Phase

Before performing display control, the mobile phone may receive a setting instruction of the user, to determine a to-be-projected image of each projection device. That the mobile phone determines, in response to a setting instruction of the user, a display interface of a to-be-projected image is shown in FIG. 4A to FIG. 4E-2.

Figure 4A:
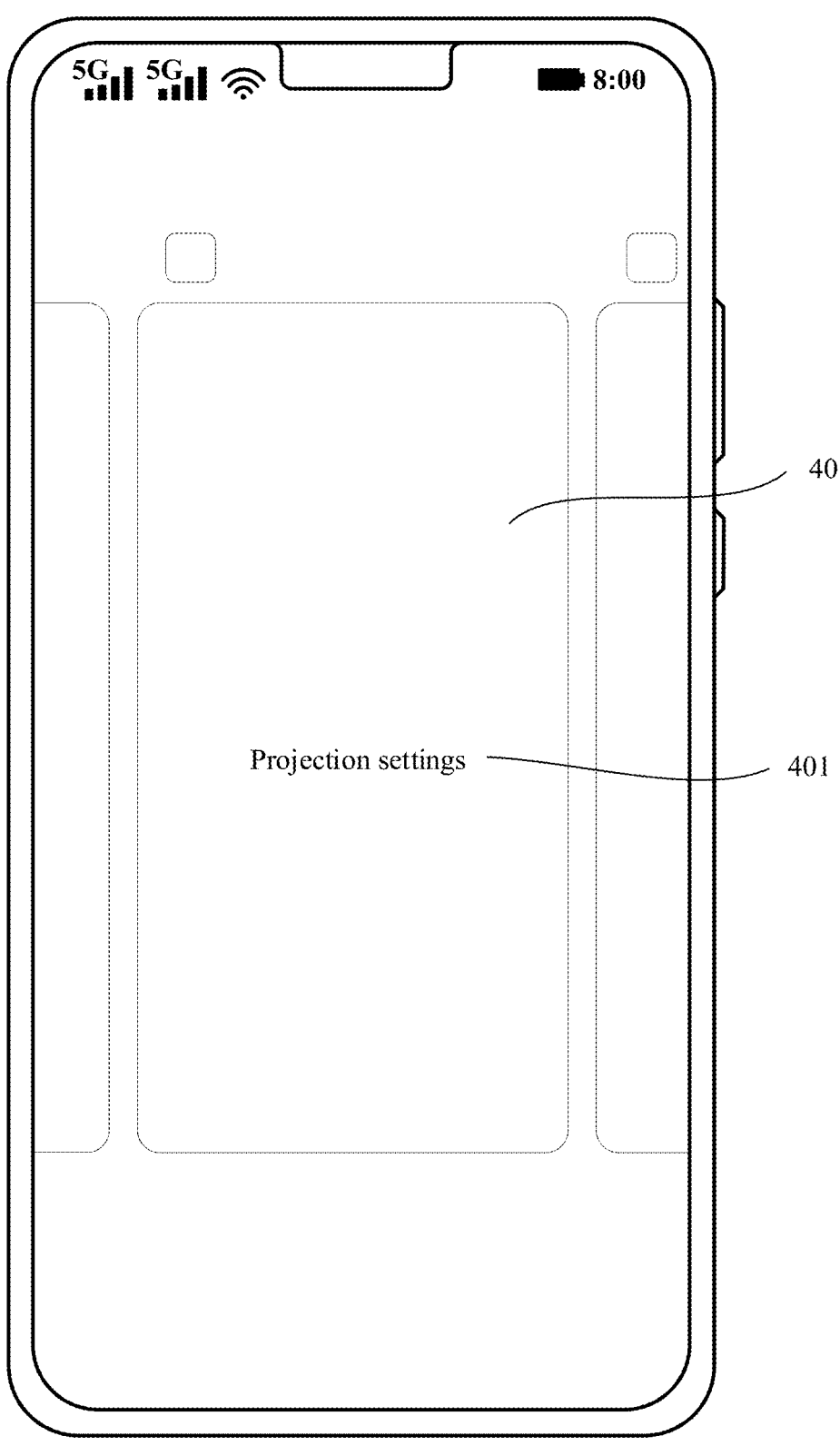
FIG. 4A is a schematic diagram of a first example display interface of a mobile phone according to an embodiment of this application.

HiCar is used as an example. After receiving an instruction of tapping the APP HiCar by the user, the mobile phone runs the APP HiCar. A GUI shown in FIG. 4A is an example display interface of a home screen of HiCar. As shown in FIG. 4A, a plurality of desktop cards run on the home screen of HiCar. For example, a home screen of the mobile phone may display an interface of one of the desktop cards. For example, a desktop card 40 is displayed on the home screen of HiCar shown in FIG. 4A. The desktop card 40 includes a title 401. The title 401 presents "Projection settings". It is to be noted that each desktop card included in the home screen of HiCar has a different title, and each desktop card provides an entry to a function. For example, the desktop card 40 is an entry for setting a projection function. In another example, a desktop card (not shown in FIG. 4A) including "One-tap navigation" is an entry of a navigation function. The mobile phone may switch, in response to an operation instruction of swiping left or right by the user, a desktop card displayed on the home screen. For example, if the mobile phone receives a gesture instruction of swiping left by the user, the desktop card 40 is moved toward the left side of the screen and is hidden, and a desktop card on the right side of the desktop card 40 is moved to the home screen for display. Further, if a gesture instruction of swiping right by the user is received again, the desktop card displayed on the home screen is moved toward the right side of the screen and is hidden, and the desktop card 40 is moved to the home screen for display. In this embodiment, the mobile phone receives an instruction of tapping the desktop card 40 by the user, and then enters a projection setting interface. Correspondingly, the GUI shown in FIG. 4A is updated to a GUI shown in FIG. 4B-1.

Figures 1, 4B:
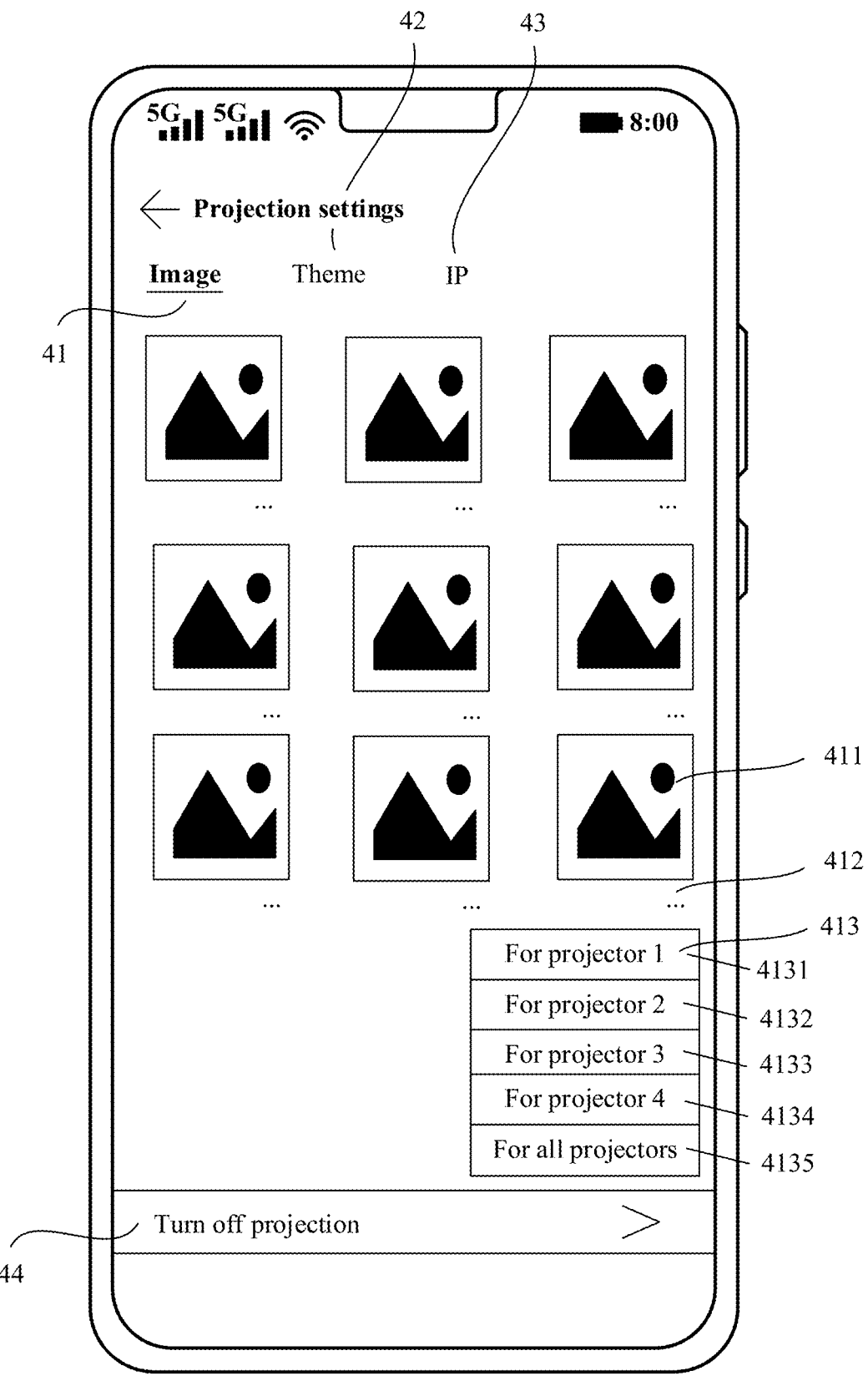
Figures 2, 4B:
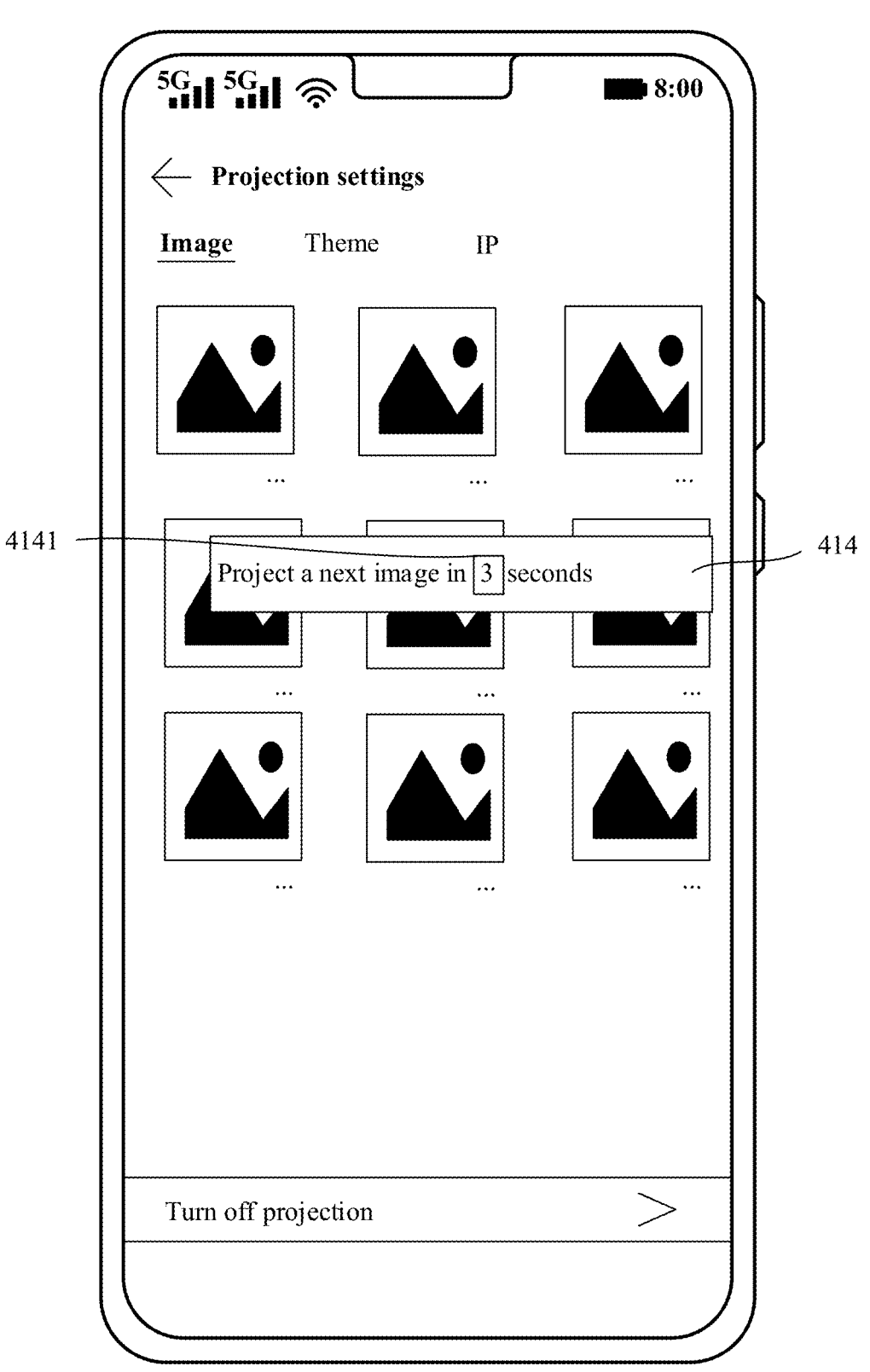

As shown in FIG. 4B-1, the GUI shown in FIG. 4B-1 is an example display interface of the projection setting interface. The projection setting interface includes, for example, an image option 41, a theme option 42, an IP option 43, and a setting entry 44 for turning off projection. In this embodiment, the image option 41 is, for example, in a selected state, and the theme option 42 and the IP option 43 are in an unselected state. Correspondingly, the GUI shown in FIG. 4B-1 displays a plurality of images. An image 411 in the plurality of images is used as an example for description. An extended function entry 412 is included at a lower right corner of the image 411, and the extended function entry 412 is presented as, for example, " . . . " After receiving an operation of tapping the extended function entry 412 by the user, the mobile phone displays a menu 413. The menu 413 includes an option "For Projector 1" 4131, an option "For Projector 2" 4132, an option "For Projector 3" 4133, an option "For Projector 4" 4134, and an option "For all projectors" 4135. The user may determine, as required, a projection device for projecting the image 411. For example, after receiving an instruction of tapping the option "For Projector 1" 4131 by the user, the mobile phone displays an identifier indicating that the option "For Projector 1" 4131 is selected, and determines that the image 411 is a to-be-projected image of the projection device 11 in FIG. 3A. It is to be understood that a setting process of each image shown in FIG. 4B-1 is similar to a setting process of the image 411. Details are not described herein again. The theme option 42, the IP option 43, and the setting entry 44 for turning off projection are respectively entries of other setting items. Refer to descriptions in the following related embodiments. Details are not described herein again.

It is to be noted that the user may set that one projection device projects at least two images. In this embodiment, after the mobile phone receives an instruction of tapping "For Projector 1" 4131 of another image by the user, the mobile phone can determine that the projection device 11 projects two images. Further, the mobile phone may display an interface for setting projection interval duration. Correspondingly, the GUI shown in FIG. 4B-1 is updated to a GUI shown in FIG. 4B-2.

As shown in FIG. 4B-2, the GUI shown in FIG. 4B-2 is an example display interface of the projection interval duration. The GUI shown in FIG. 4B-2 includes a dialog box 414. Content presented in the dialog box 414 is, for example, "Project a next image in one second", where "1" is displayed on a control 4141. In some embodiments, when the user swipes up or down in an area range of the control 4141, the mobile phone changes, in response to a swipe gesture instruction, a number displayed on the control 4141. For example, when the user swipes from bottom to top, the mobile phone makes, in response to an upward swipe gesture instruction, the number displayed on the control 4141 is incremented sequentially. For example, numbers "2", "3", "4", and "5" are displayed sequentially. When the user swipes from top to bottom, the mobile phone makes, in response to a downward swipe gesture instruction, the number displayed on the control 4141 decreases sequentially. For example, numbers "4", "3", "2", and "1" are displayed sequentially. Optionally, for example, the user stops swiping when the number displayed on the control 4141 is "3". In this way, the dialog box 414 presents "Project a next image in 3 seconds". Correspondingly, after the mobile phone controls the projection device 11 to project the image 411 for three seconds, a next image is projected, and so on. In addition, the mobile phone, for example, controls, based on a sequence of selecting images by the user, corresponding projection devices to sequentially project the images.

Further, in some embodiments, after detecting that the user changes the number displayed on the control 4141 and detecting an operation that the user moves away the hand, the mobile phone hides the dialog box 414, and displays an entry of the dialog box 414 in a manner of a floating button on the interface, so that the user can change the projection interval duration at any time.

Refer to FIG. 4B-1 again. In some other embodiments, the mobile phone may present, in response to an operation of tapping the theme option 42 by the user, a selection interface of a to-be-projected theme to the user. Correspondingly, the GUI shown in FIG. 4B-1 is updated to a GUI shown in FIG. 4C.

Figure 4C:
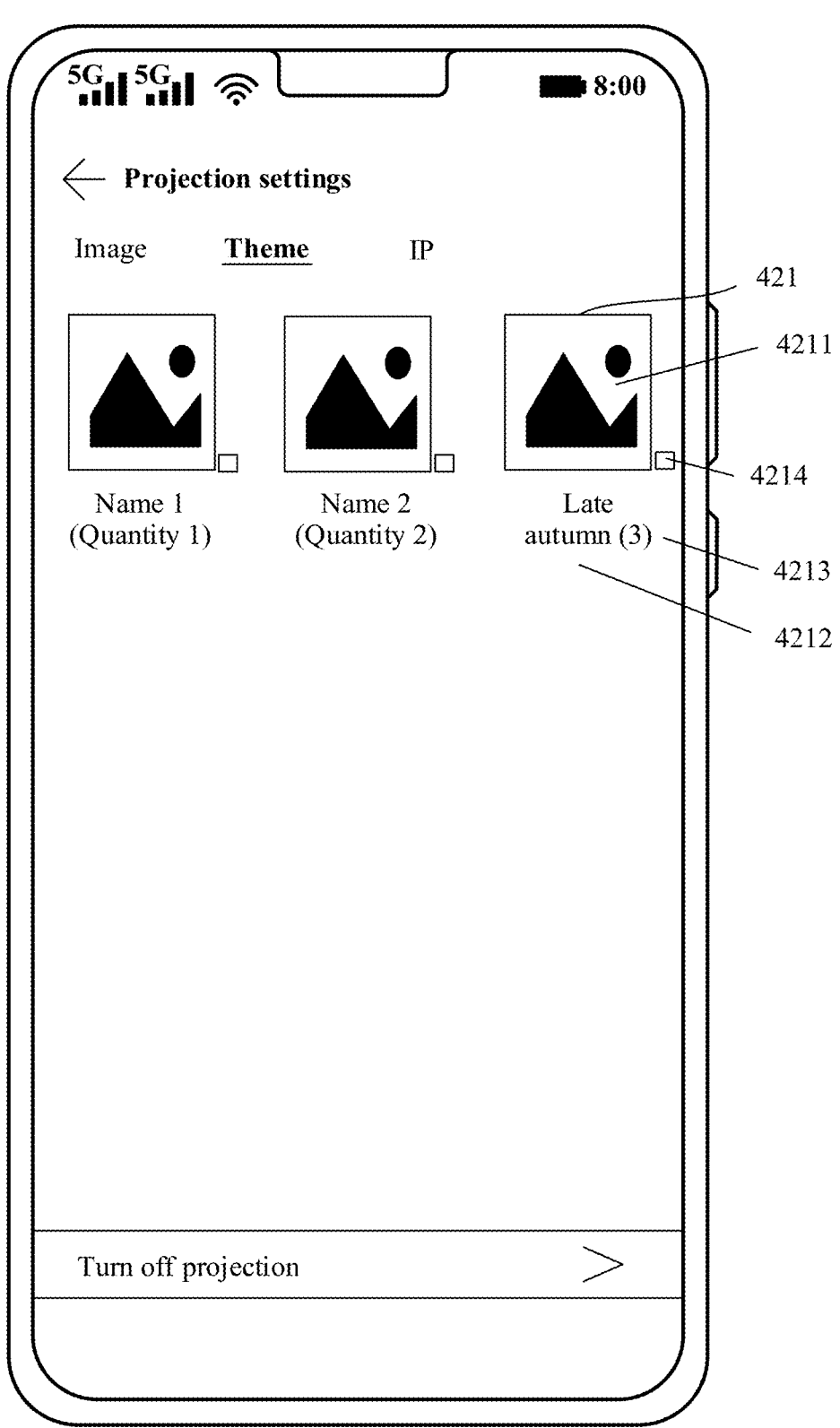
FIG. 4C is a schematic diagram of a fourth example display interface of a mobile phone according to an embodiment of this application.

As shown in FIG. 4C, the GUI shown in FIG. 4C is a second example display interface of the projection setting interface. The display interface includes an image option, a theme option, an IP option, and a setting entry for turning off projection. In this embodiment, for example, the theme option is in a selected state, and the image option and the IP option are in an unselected state. Correspondingly, the GUI shown in FIG. 4C displays a plurality of themes, where each theme may include at least two images. A theme 421 in the plurality of themes is used as an example for description. The mobile phone displays a cover image 4211 of the theme 421, a name 4212 of the theme 421, an identifier 4213 of a total quantity of images included in the theme 421, and a check box 4214. The cover image 4211 of the theme 421 may be any image in the images included in the theme 421. The name 4212 of the theme 421 is, for example, "Late autumn". For example, the identifier 4213 displays "3", indicating that the theme 421 includes three images. The check box 4214 is used to provide a selection entry to the user. After receiving an instruction of tapping the check box 4214 by the user, the mobile phone controls the check box 4214 to display a selected identifier, and determines the three images included in the theme 421 as to-be-projected images. The selected identifier may be implemented as a symbol, for example, a symbol "√". It is to be understood that meanings of interface elements included in each theme shown in FIG. 4C are shown in the theme 421. An implementation process in which each theme is selected as a to-be-projected theme is similar to a process in which the theme 421 is selected. Details are not described herein.

In an actual implementation, a quantity of images included in the to-be-projected theme may be the same as or different from a quantity of projection devices. When the quantity of images included in the to-be-projected theme is the same as the quantity of projection devices, the mobile phone may control the projection devices to be in a one-to-one correspondence with the images included in the theme, so that each projection device projects one image included in the theme. When the quantity of images included in the to-be-projected theme is greater than the quantity of projection devices (for example, four projection devices), in a scenario in which a projection function is turned on each time, the mobile phone may randomly select four images from the images of the to-be-projected theme as to-be-projected images. When the quantity of images included in the to-be-projected theme is less than the quantity of projection devices, for example, the theme includes three images and the quantity of projection devices is 4, the mobile phone may control the three projection devices to respectively project the three images, and randomly select one of the three images as a to-be-projected image by the fourth projection device.

It may be understood that the foregoing descriptions of embodiments of the projection theme are merely examples for description, and do not constitute a limitation on embodiments of this application. In some other embodiments, the mobile phone may project an image included in the theme in another matching manner. For example, in a scenario in which the quantity of images included in the to-be-projected theme is less than the quantity of projection devices, the mobile phone may control three projection devices to respectively project the three images, and control the fourth projection device to always project a cover image of the theme. This is not limited here.

Refer to FIG. 4B-1 again. In some other embodiments, the mobile phone may present, in response to an operation of tapping the IP option 43 by the user, a selection interface of a to-be-projected IP to the user. Correspondingly, the GUI shown in FIG. 4B-1 is updated to a GUI shown in FIG. 4D.

Figure 4D:
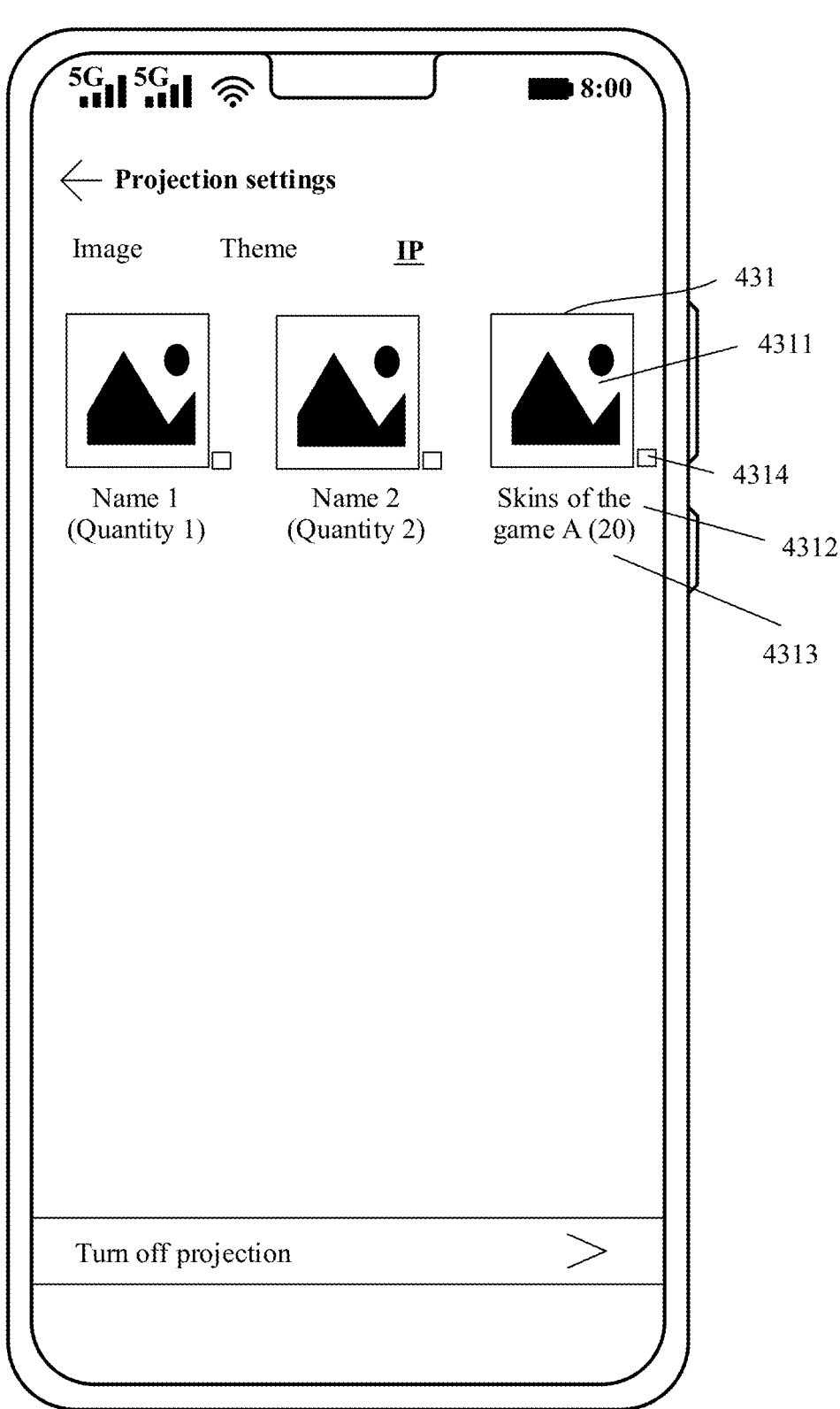
FIG. 4D is a schematic diagram of a fifth example display interface of a mobile phone according to an embodiment of this application.

As shown in FIG. 4D, the GUI shown in FIG. 4D is a third example display interface of the projection setting interface. The display interface includes an image option, a theme option, an IP option, and a setting entry for turning off projection. In this embodiment, for example, the IP option is in a selected state, and the image option and the IP option are in an unselected state. Correspondingly, the GUI shown in FIG. 4D displays a plurality of IPs, where each IP may include at least two images. An IP 431 in the plurality of IPs is used as an example for description. The mobile phone displays a cover image 4311 of the IP 431, a name 4312 of the IP 431, an identifier 4313 of a total quantity of images included in the IP 431, and a check box 4314. The cover image 4311 of the IP 431 may be any image in the images included in the IP 431. The name 4312 of the IP 431 is, for example, "Skin of game A". For example, the identifier 4313 displays "20", indicating that the IP 431 includes 20 images. The check box 4314 has the same function as the check box 4214, and is used to provide a selection entry to the user and indicate whether the IP 431 is the to-be-projected IP. Details are not described herein. Meanings of interface elements included in each IP shown in FIG. 4D are shown in IP 431. Details are not described herein.

In this embodiment, in a scenario in which a quantity of images included in the to-be-projected IP is less than or equal to a quantity of projection devices, an implementation process in which the mobile phone controls the projection device to perform projection is similar to the embodiment corresponding to FIG. 4C. Details are not described herein again. In a scenario in which the quantity of images included in the to-be-projected IP is greater than the quantity of projection devices, the mobile phone may control the projection devices to switch projected images at specific intervals. In some embodiments, for example, there are four projection devices. The mobile phone may control the four projection devices to respectively project the first image to the fourth image of the IP. After three seconds, the mobile phone controls the four projection devices to respectively project the fifth image to the eighth image of the IP, and so on. In some other embodiments, for example, there are four projection devices. The mobile phone may randomly select four images from the images included in the IP each time for projection. It is to be understood that in this embodiment, after the user selects an IP, the mobile phone may present a GUI shown in FIG. 4B-2, so that the user enters interval duration. Details are not described herein again.

In some embodiments, the image, the theme, and the IP may be provided by HiCar. In some other embodiments, the image, the theme, and the IP may be downloaded by the mobile phone from a cloud server. In some other embodiments, the mobile phone may further periodically interact with a cloud server, to update an image, a theme, and an IP that are stored on the mobile phone.

The mobile phone further provides an entry for the user to set a trigger condition for turning off projection. In any implementation scenario shown in FIG. 4B-1, FIG. 4C, and FIG. 4D, the mobile phone may enter, in response to an instruction of tapping a setting entry for turning off projection by the user, a setting interface for turning off projection. Correspondingly, the GUI is updated to a GUI shown in FIG. 4E-1.

Figures 1, 4E:
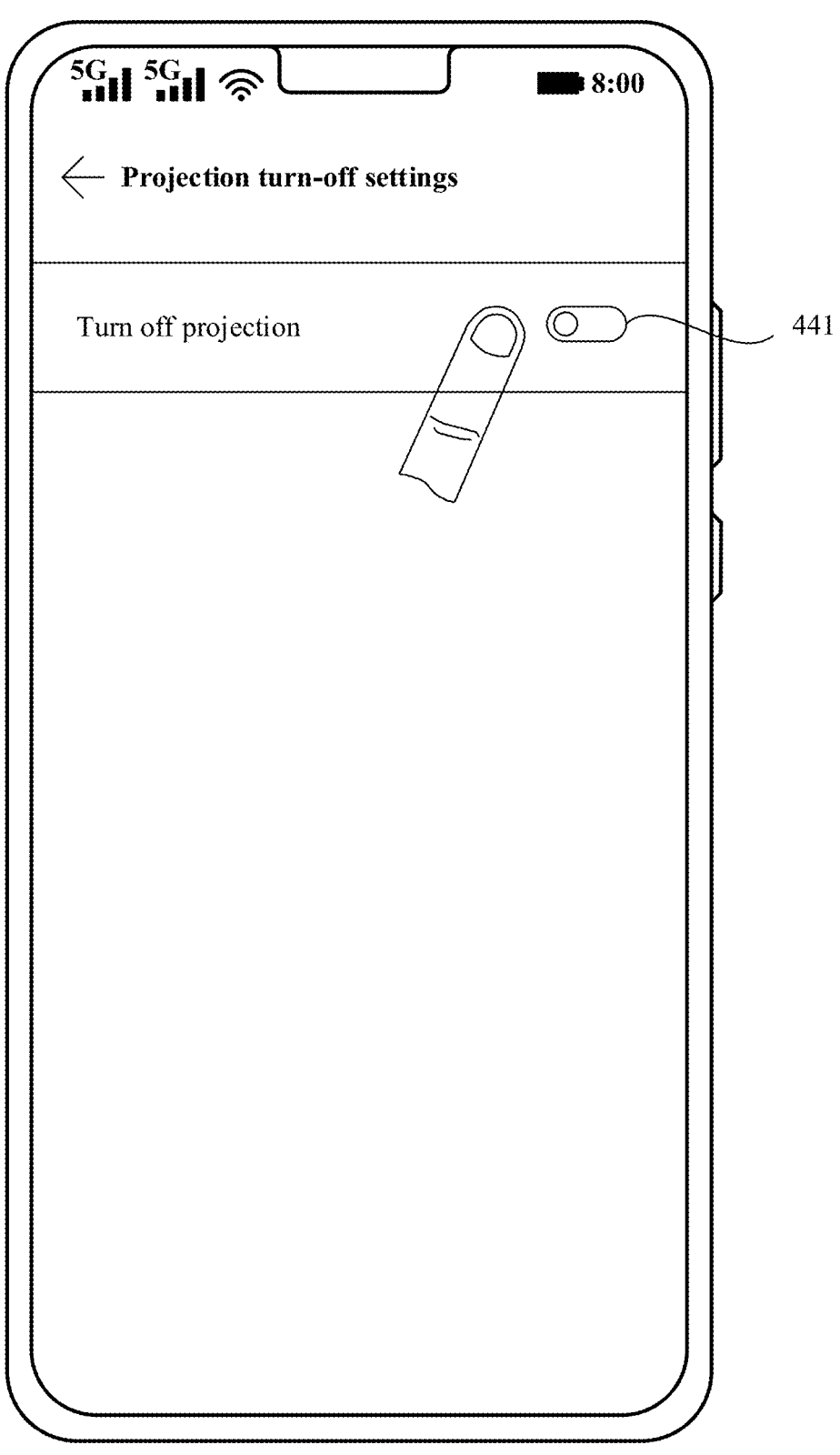
Figures 2, 4E:
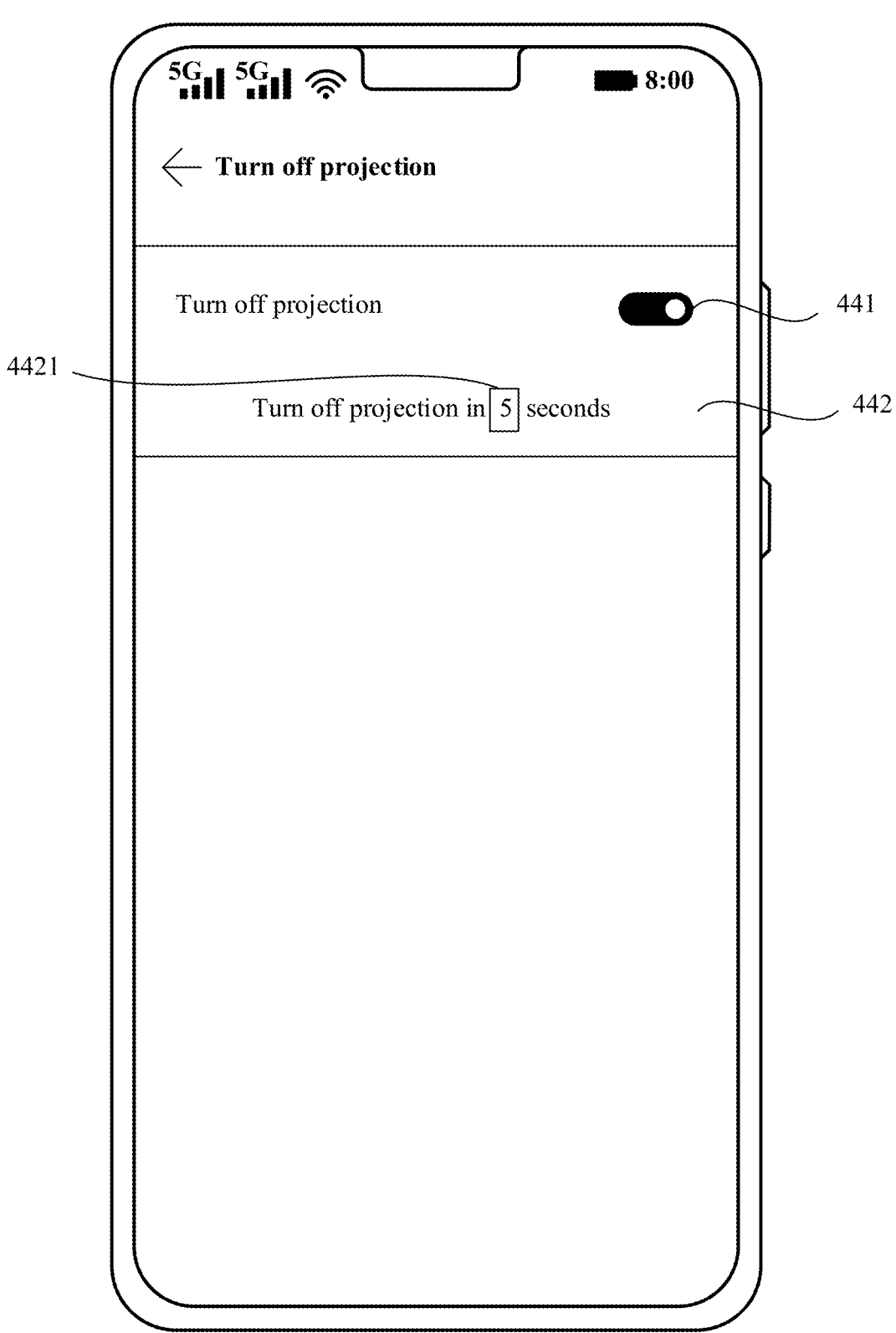

As shown in FIG. 4E-1, the GUI shown in FIG. 4E-1 is an example display interface of projection turn-off settings. The interface of the projection turn-off settings includes an option button 441 for turning off projection. In this embodiment, a default setting is, for example, not turning off projection. Correspondingly, a default state of the option button 441 is, for example, an off state. After receiving an instruction of tapping the option button 441 by the user, the mobile phone enters a setting interface for automatically turning off projection. Correspondingly, the GUI shown in FIG. 4E-1 is updated to a GUI shown in FIG. 4E-2.

As shown in FIG. 4E-2, the GUI shown in FIG. 4E-2 is another example display interface of projection turn-off settings. An option button 441 in the GUI shown in FIG. 4E-2 is in an on state, and the GUI further includes a timing option 442 and a setting saving button 443. In this embodiment, content of the timing option 442 is, for example, "turn off projection in 5 seconds" by default. That is, after receiving a turn-off instruction and performing timing for 5 seconds, the mobile phone sends the projection turn-off instruction to the projection device, to control a corresponding projection device to turn off projection. "5" in the timing option 442 is, for example, displayed on the control 4421, so that the user can flexibly set duration of the timing. For example, when the user swipes up or down in an area range of the control 4421, the mobile phone may change, in response to a swipe gesture instruction, a number displayed on the control 4421, to determine duration of timing after the turn-off instruction is received. For an embodiment in which the mobile phone changes, in response to a swipe gesture instruction of the user, the number displayed on the control 4421, refer to the description of the embodiment shown in FIG. 4B-2. Details are not described herein again. Further, after receiving an instruction of tapping the setting saving button 443 by the user, the mobile phone obtains setting information such as the duration of the timing, and updates the display interface to the GUI shown in FIG. 4B-1.

It may be understood that FIG. 4A to FIG. 4E-2 are merely an example for description, and constitutes no limitation on embodiments of this application. In some other embodiments, display interfaces in the foregoing scenarios may vary according to different equipped systems, device brands, device models, system versions, and the like of terminal devices. This is not limited in embodiments of this application.

It can be learned that, in this implementation, the mobile phone can provide a variety of projected images and a flexible and extensible projection mechanism to a user, so that a vehicle can present a personalized visual effect to the user based on a setting of the user. This can improve user experience.

Display Phase

After the foregoing projection setting is completed, the mobile phone may control, according to the foregoing setting information, the projection device 11, the projection device 12, the projection device 13, and the projection device 14 to perform projection, so that a display effect of projected images is presented in the vehicle. (a) and (b) in FIG. 5 show example display effects in a vehicle.

Figure 5:
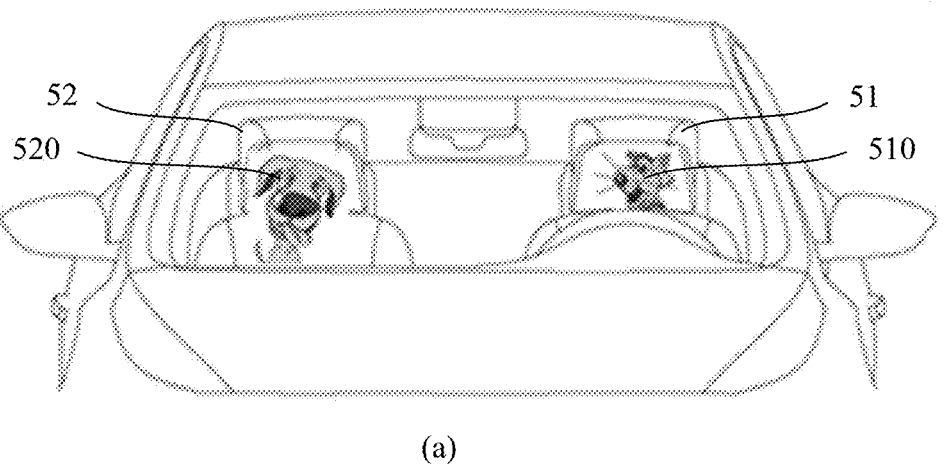
FIG. 5 is a schematic diagram of an example visual effect of a vehicle according to an embodiment of this application.
Figure 5:
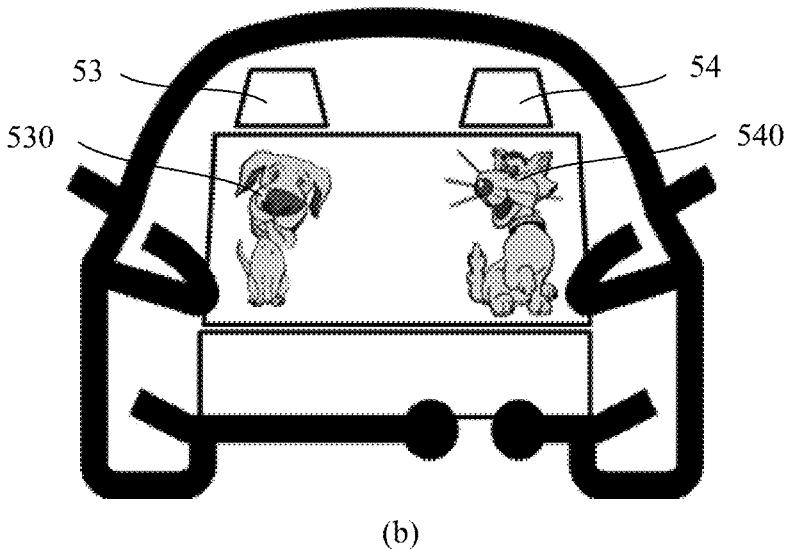

(a) in FIG. 5 shows example display effects to a seat 51 and a seat 52 of the vehicle, and (b) in FIG. 5 shows example display effects to a seat 53 and a seat 54 of the vehicle. The seat 51 displays an image 510, the seat 52 displays an image 520, the seat 53 displays an image 530, and the seat 54 displays an image 540. For example, before the projection device 11, the projection device 12, the projection device 13, and the projection device 14 perform projection, the seat 51, the seat 52, the seat 53, and the seat 54, for example, display no pattern. After the projection device 11, the projection device 12, the projection device 13, and the projection device 14 perform projection, the projection device 11 projects the image 510, for example, to the seat 51, the projection device 12 projects the image 520, for example, to the seat 52, the projection device 13 projects the image 530, for example, to the seat 53, and the projection device 14 projects the image 540, for example, to the seat 54, so that the vehicle presents the display effects shown in FIG. 5.

In different implementation scenarios, trigger conditions for the mobile phone to control projection of the projection device are different. A plurality of example trigger scenarios are used as an example for description below with reference to FIG. 5.

Scenario 1: After receiving a trigger instruction (for example, an instruction of tapping the setting saving button 443 in FIG. 4E-2 by the user) for completing a setting by the user, the mobile phone may send a projection start instruction to a projection manager in the vehicle according to setting information. The projection start instruction includes, for example, identifiers of the projection device 11, the projection device 12, the projection device 13, and the projection device 14, and image information corresponding to each projection device. Then, the projection manager controls the projection device 11 to project the image 510, the projection device 12 to project the image 520, the projection device 13 to project the image 530, and the projection device 14 to project the image 540, so that the vehicle presents the display effects shown in FIG. 5.

Scenario 2: After the foregoing projection setting is completed, after a vehicle door of the vehicle is unlocked by a vehicle key or a vehicle control APP, the vehicle door may send an unlocking signal to the mobile phone. Then, the mobile phone sends a projection start instruction to the projection manager in the vehicle according to setting information. In this way, the projection manager controls the projection device 11, the projection device 12, the projection device 13, and the projection device 14 to perform projection, so that the vehicle presents the display effects shown in FIG. 5.

Scenario 3: After the foregoing projection setting is completed, in a process in which the user opens a vehicle door of the vehicle, the vehicle door may send, to the mobile phone, a signal indicating that the vehicle door is open. Then, the mobile phone sends a projection start instruction to the projection manager in the vehicle according to setting information. In this way, the projection manager controls the projection device 11, the projection device 12, the projection device 13, and the projection device 14 to perform projection, so that the vehicle presents the display effects shown in FIG. 5.

It may be understood that the foregoing display implementation scenarios and the display effects shown in FIG. 5 are all examples for description, and constitute no limitation on embodiments of this application. In some other embodiments, the mobile phone may further control, in response to the setting information after controlling the projection devices to continuously project the images shown in FIG. 5 for a specific time, the projection devices to project other images. Correspondingly, an image to each seat in FIG. 5 is updated to another image, and so on. Details are not described herein again.

It can be learned that in this implementation, a projection device is installed in the vehicle, and the mobile phone controls the projection device to project an image to a seat of the vehicle or the like, to implement personalized display in the vehicle.

Display Stop Phase

Further, to facilitate use of the vehicle by the user, the mobile phone may further control, in response to an instruction triggered by the user in a process of using the vehicle, the projection device to turn off projection, to stop displaying a visual effect in the vehicle.

In different implementation scenarios of this application, implementations in which the mobile phone controls the projection device to be turned off may be different. A plurality of example trigger scenarios are used as an example for description below with reference to FIG. 5.

Scenario 1: After a vehicle door of the vehicle is closed and locked by the user, the vehicle door may send a vehicle door locking signal to the mobile phone. Then, the mobile phone sends the projection turn-off instruction to the projection manager in the vehicle. For example, the projection turn-off instruction corresponds to the projection device 11, the projection device 12, the projection device 13, and the projection device 14. Further, the projection manager controls the projection device 11, the projection device 12, the projection device 13, and the projection device 14 to turn off projection, so that the image to each seat in FIG. 5 stops being displayed.

In some embodiments, after receiving the vehicle door locking signal, the mobile phone may immediately send the projection turn-off instruction to the projection manager, to control displaying of the image to each seat in FIG. 5 to be immediately stopped. In some other embodiments, after receiving the vehicle door locking signal, the mobile phone may start timing, and when the timing reaches the duration of the timing set in FIG. 4E-2, send the projection turn-off instruction to the projection manager, to control displaying of the image to each seat in FIG. 5 to be automatically stopped after the duration of the timing is reached.

Scenario 2: When a user sits in a seat of the vehicle, the mobile phone may control, in a directed manner, a projection device that performs projection on the seat. For example, when a user sits on the seat 51 in FIG. 5, the vehicle can obtain a gravity sensing signal of the seat 51, and then the vehicle sends the gravity sensing signal indicating the seat 51 to the mobile phone. Then, the mobile phone sends, to the projection manager in the vehicle, an instruction for turning off the projection device 11. In this way, the projection manager controls the projection device 11 to turn off projection, so that the image 510 in FIG. 5 stops being displayed, and the image 520, the image 530, and the image 540 continue to be displayed.

In an optional implementation, after receiving the gravity sensing signal, the mobile phone may immediately send, to the projection manager, an instruction for turning off a corresponding projection device, to trigger displaying of the projected image of the related seat to be immediately stopped.

It may be understood that the foregoing implementation scenarios of display stop are merely examples for description, and do not constitute a limitation on embodiments of this application. In some other embodiments, the mobile phone may control, in response to another signal instruction, a related projection device to turn off projection. Details are not described herein again.

As can be seen, through this implementation, a mobile phone can flexibly control, based on a usage scenario of the user, the projection device in the vehicle to turn off display, so that the user can use the vehicle conveniently, and user experience can be further optimized.

The foregoing embodiments are described by using an example in which the terminal device is implemented as a mobile phone. In an actual implementation, the terminal device may be implemented as an in-vehicle device or the like. In an implementation scenario in which the terminal device is implemented as an in-vehicle device, for a display interface presented by the in-vehicle device in response to a trigger of a user, refer to embodiments shown in FIG. 4A to FIG. 4E-2. A signaling interaction process between the in-vehicle device and a projection device is similar to a signaling interaction process between a mobile phone and a projection device. Details are not described herein again.

In addition, although this specification is described by using a projection of a still image as an example, the technical solutions in embodiments of this application are not limited thereto. In some other embodiments, an image projected in a vehicle may respond to a touch of a user, to implement a function of interacting with the user. For example, an image projected in the vehicle is a plurality of bubbles. When the user touches one of the bubbles, the bubble may present a moving visual effect. Details are not described in embodiments of this application again.

It is to be noted that the foregoing embodiments are described by using a display effect of a seat of a vehicle as an example, and the technical solutions in embodiments of this application are not limited thereto. In some other embodiments, the mobile phone may control the projection device to perform projection on a window of a vehicle, so that the window of the vehicle presents a personalized visual effect. In some other embodiments, an implementation scenario of the technical solutions in embodiments of this application may be not limited to a vehicle.

In summary, it can be learned that in the implementations of embodiments of this application, a projection device is installed in the vehicle, and the terminal device controls the projection device to project an image to a seat of the vehicle or the like, to implement personalized display in the vehicle. In this way, a personalized visual effect can be presented to a user, and the user can flexibly select an image to be projected from a large image library, so that a display effect of the vehicle has high scalability, and user experience is optimized.

In the foregoing embodiments, the solutions of the display control method provided in embodiments of this application are described from perspectives of a hardware entity structure, a software architecture, and actions performed by software and hardware of the terminal device or the like. Persons skilled in the art should be easily aware that, with reference to the processing steps of controlling projection of a projection device in response to a display instruction and the like described in embodiments disclosed in this specification, embodiments of this application can be implemented by hardware or a combination of hardware and computer software. Whether some functions are performed by hardware or the computer software driving hardware depends on particular applications and design constraint conditions of the technical solutions. Persons skilled in the art may use different methods to implement the described functions for the foregoing each particular application, but it is not to be considered that the implementation goes beyond the scope of embodiments of this application.

Figure 6A:
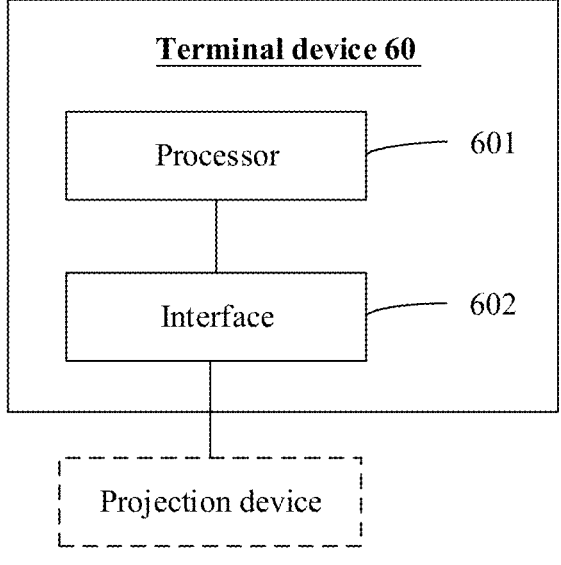
FIG. 6A is a schematic diagram of example composition of a terminal device 60 according to an embodiment of this application.

For example, as shown in FIG. 6A, corresponding to the foregoing display control method, the terminal device described in embodiments of this application may be alternatively implemented as a terminal device 60. The terminal device 60 may include at least one processor 601 and an interface 602. The interface 602 may be coupled to the processor 601, and establish a connection between the terminal device 60 and a projection device. The interface 602 is configured to receive code instructions and transmit the code instructions to the processor 601. The processor 601 may run the code instructions, and send control instructions to the projection device through the interface 602, to implement a display control function of the terminal device 60 in embodiments of this application.

Figure 6B:
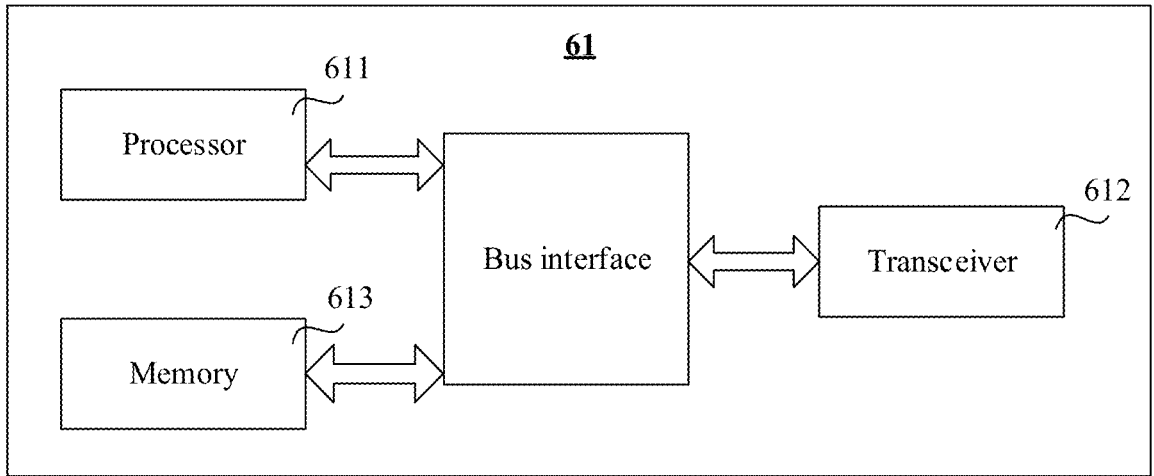
FIG. 6B is a schematic diagram of an example structure of a terminal device 61 according to an embodiment of this application.

The terminal device is described above from one perspective. In some other embodiments, the foregoing functions may be implemented by using different hardware entities. For example, receiving and sending functions of the instructions may be implemented by a transceiver. For example, as shown in FIG. 6B, an embodiment of this application further provides a terminal device 61. The terminal device 61 may include a processor 611, a transceiver 612, and a memory 613. The transceiver 612 is configured to perform instruction receiving and sending in any embodiment of the foregoing display control method. The memory 613 may be configured to store a program/code. The processor 611 is configured to execute the program/code stored in the memory 613 to perform processing other than instruction receiving and sending in the foregoing display control method. Details are not described again herein.

For specific content, refer to the description of the foregoing embodiments related to the display control method. Details are not described herein again.

It is to be understood that the terminal device is described in FIG. 1, FIG. 6A, and FIG. 6B from different perspectives. In an actual implementation, the processor 611 may be implemented as, for example, the processor 110 shown in FIG. 1, the transceiver 612 may be implemented as, for example, the wireless communication module 150 shown in FIG. 1, and the memory 613 may be implemented as, for example, the memory 120 shown in FIG. 1. Details are not described herein again.

In a specific implementation, corresponding to the terminal device, an embodiment of this application further provides a computer storage medium. The computer storage medium disposed in any device may store a program. When the program is executed, some or all steps in embodiments including the foregoing display control method may be implemented. A storage medium in any device may be a magnetic disk, an optical disc, a read-only memory (ROM), a random access memory (RAM), or the like.

In this embodiment of this application, the transceiver may be a wired transceiver, a wireless transceiver, or a combination thereof. The wired transceiver may be, for example, a sensor. The wireless transceiver may be, for example, a wireless local area network transceiver, a cellular network transceiver, or a combination thereof. The processor may be a central processing unit (CPU), a network processor (NP), or a combination of the CPU and the NP. The processor may further include a hardware chip. The hardware chip may be an application-specific integrated circuit (ASIC), a programmable logic device (PLD), or a combination thereof. The PLD may be a complex programmable logic device (CPLD), a field programmable logic gate array (FPGA), a generic array logic (GAL), or any combination thereof. The memory may include a volatile memory, for example, a random access memory (RAM). The memory may include a non-volatile memory, for example, a read-only memory (ROM), a flash memory, a hard disk drive (HDD), or a solid-state drive (SSD). The memory may further include a combination of the foregoing types of memories.

A bus interface may further be included in FIG. 6B. The bus interface may include any quantity of interconnecting buses and bridges, and specifically connect together various circuits of one or more processors represented by the processor and a memory represented by the memory. The bus interface may further link together various other circuits, such as a peripheral device, a voltage regulator, and a power management circuit. This is well known in the art, and therefore is not further described in this specification. The bus interface provides an interface. The transceiver provides a unit for communicating with various other devices on a transmission medium. The processor is responsible for bus architecture management and general processing. The memory may store data used when the processor performs an operation.

Persons skilled in the art may further understand that various illustrative logical blocks and steps that are listed in embodiments of this application may be implemented by using electronic hardware, computer software, or a combination thereof. Whether the functions are implemented by hardware or software depends on particular applications and a design requirement of the entire system. Persons skilled in the art may use various methods to implement the described functions for each particular application, but it is not to be considered that the implementation goes beyond the scope of embodiments of this application.

The various illustrative logical units and circuits in embodiments of this application may implement or operate the described functions by using a general-purpose processor, a digital signal processor, an application-specific integrated circuit (ASIC), a field programmable gate array (FPGA) or another programmable logical apparatus, a discrete gate or transistor logic, a discrete hardware component, or a design of any combination thereof. The general-purpose processor may be a microprocessor. Optionally, the general-purpose processor may also be any conventional processor, controller, microcontroller, or state machine. The processor may alternatively be implemented by a combination of computing apparatuses, such as a digital signal processor and a microprocessor, a plurality of microprocessors, one or more microprocessors in combination with a digital signal processor core, or any other similar configuration.

Steps of the methods or algorithms described in embodiments of this application may be directly embedded into hardware, a software unit executed by a processor, or a combination thereof. The software unit may be stored in a RAM memory, a flash memory, a ROM memory, an EPROM memory, an EEPROM memory, a register, a hard disk, a removable magnetic disk, a CD-ROM, or a storage medium of any other form in the art. For example, the storage medium may be connected to a processor, so that the processor may read information from the storage medium and write information to the storage medium. Alternatively, the storage medium may be integrated into a processor. The processor and the storage medium may be arranged in an ASIC, and the ASIC may be arranged in an electronic device. Optionally, the processor and the storage medium may be arranged in different components of the electronic device.

It is to be understood that sequence numbers of the foregoing processes do not mean execution sequences in embodiments of this application. The execution sequences of the processes should be determined based on functions and internal logic of the processes, and should not be construed as any limitation on the implementation processes of embodiments.

All or some of the foregoing embodiments may be implemented by software, hardware, firmware, or any combination thereof. When software is used to implement embodiments, all or some of embodiments may be implemented in a form of a computer program product. The computer program product includes one or more computer instructions. When the computer program instructions are loaded and executed on a computer, the procedures or functions according to this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a web site, computer, server, or packet center to another web site, computer, server, or packet center in a wired (for example, a coaxial cable, an optical fiber, or a digital subscriber line (DSL)) or wireless (for example, infrared, radio, or microwave) manner. The computer-readable storage medium may be any usable medium accessible by a computer, or a packet storage device, for example, a server or a packet center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

Embodiments in this specification are all described in a progressive manner, for same or similar parts in embodiments, refer to these embodiments, and each embodiment focuses on a difference from other embodiments. Especially, apparatus and system embodiments are basically similar to a method embodiment, and therefore are described briefly. For related parts, refer to partial descriptions in the method embodiment.

Although some embodiments of this application have been described, persons skilled in the art can make changes and modifications to these embodiments once they learn the basic inventive concept. Therefore, the following claims are intended to be construed as to cover the embodiments of this application and all changes and modifications falling within the scope of this application.

It is clear that Persons skilled in the art can make various modifications and variations to this application without departing from the spirit and scope of this application. This application is intended to cover these modifications and variations of this application provided that they fall within the scope of protection defined by the claims of this application and their equivalent technologies.

What is claimed is:

1. A terminal device, comprising:

at least one processor; and one or more memories coupled to the at least one processor and storing programming instructions for execution by the at least one processor to cause the terminal device to perform operations comprising:

wirelessly controlling, by the terminal device in response to a display instruction received by the terminal device, at least one projection device in a vehicle to perform projection in the vehicle, wherein the display instruction comprises a vehicle door unlocking signal of the vehicle and a vehicle door opening signal of the vehicle, wherein the at least one projection device projects an image displayed on at least one seat in the vehicle, and wherein wirelessly controlling the at least one projection device to perform projection in the vehicle comprises:

in response to the display instruction, sending, by the terminal device, a projection start instruction to the vehicle, wherein the projection start instruction comprises at least one identifier of the at least one projection device and image information corresponding to each of the at least one projection device;

receiving, by the terminal device, a turn-off instruction, wherein a photographing device indicated by the turn-off instruction comprises a first projection device, and the first projection device is a projection device of the at least one projection device; and wirelessly controlling, by the terminal device, the first projection device to turn off projection of the image on the at least one seat, wherein the turn-off instruction comprises a sensing signal, and the sensing signal indicates a user to sit on the at least one seat of the vehicle.

2. The terminal device according to claim 1, wherein the wirelessly controlling, by the terminal device, the at least one projection device to perform projection in the vehicle comprises:

wirelessly controlling, by the terminal device, each of the at least one projection device to project a first image.

3. The terminal device according to claim 2, wherein the operations further comprise:

starting, by the terminal device, timing at a moment at which the terminal device controls the at least one projection device to project the first image; and after the timing reaches a first duration, controlling, by the terminal device, the at least one projection device to project a second image.

4. The terminal device according to claim 1, wherein the image displayed on the at least one seat in the vehicle comprises an image that alters a visual appearance of the image in response to a user interaction.

5. The terminal device according to claim 1, wherein the vehicle comprises a plurality of seats and a plurality of projection devices corresponding to the plurality of seats, and wherein wirelessly controlling the at least one projection device to perform projection in the vehicle comprises:

controlling each of the plurality of projection devices to project a respective image on a corresponding one of the plurality of seats.

6. A display control method for applying to a vehicle in which at least one projection device is installed, the display control method comprising:

receiving, by a terminal device, a display instruction, wherein the display instruction comprises a vehicle door unlocking signal of the vehicle and a vehicle door opening signal of the vehicle;

wirelessly controlling, by the terminal device in response to the display instruction, the at least one projection device to perform projection in the vehicle, wherein the at least one projection device projects an image displayed on at least one seat in the vehicle, and wherein wirelessly controlling the at least one projection device to perform projection in the vehicle comprises:

in response to the display instruction, sending, by the terminal device, a projection start instruction to the vehicle, wherein the projection start instruction comprises at least one identifier of the at least one projection device and image information corresponding to each of the at least one projection device;

receiving, by the terminal device, a turn-off instruction, wherein a photographing device indicated by the turn-off instruction comprises a first projection device, and the first projection device is a projection device of the at least one projection device; and wirelessly controlling, by the terminal device, the first projection device to turn off projection of the image on the at least one seat, wherein the turn-off instruction comprises a sensing signal, and the sensing signal indicates a user to sit on the at least one seat of the vehicle.

7. The display control method according to claim 6, wherein the wirelessly controlling, by the terminal device, the at least one projection device to perform projection in the vehicle comprises:

wirelessly controlling, by the terminal device, each of the at least one projection device to project a first image.

8. The display control method according to claim 7, further comprising:

starting, by the terminal device, timing at a moment at which the terminal device controls the at least one projection device to project the first image; and after the timing reaches a first duration, controlling, by the terminal device, the at least one projection device to project a second image.

9. The display control method according to claim 6, wherein the wirelessly controlling, by the terminal device, the at least one projection device to perform projection in the vehicle comprises:

wirelessly controlling, by the terminal device, the first projection device to project a third image; and wirelessly controlling, by the terminal device, a second projection device to project a fourth image, wherein both the first projection device and the second projection device belong to the at least one projection device.

10. The display control method according to claim 9, further comprising:

starting, by the terminal device, timing at a moment at which the terminal device controls the first projection device to project the third image and controls the second projection device to project the fourth image; and after the timing reaches a second duration:

controlling, by the terminal device, the first projection device to project a fifth image; and controlling, by the terminal device, the second projection device to project a sixth image.

11. The display control method according to claim 6, wherein the wirelessly controlling, by the terminal device, the first projection device to turn off projection of the image on the at least one seat further comprises:

starting timing at a moment at which the terminal device receives the turn-off instruction; and when the timing reaches a third duration, controlling the first projection device to turn off the projection of the image on the at least one seat.

12. The display control method according to claim 6, wherein the image displayed on the at least one seat in the vehicle comprises an image that alters a visual appearance of the image in response to a user interaction.

13. The display control method according to claim 6, wherein the vehicle comprises a plurality of seats and a plurality of projection devices corresponding to the plurality of seats, and wherein wirelessly controlling the at least one projection device to perform projection in the vehicle comprises:

controlling each of the plurality of projection devices to project a respective image on a corresponding one of the plurality of seats.

14. A non-transitory computer-readable storage medium storing one or more instructions executable by a computer system to perform operations comprising:

wirelessly controlling, by a terminal device in response to a display instruction received by the terminal device, at least one projection device in a vehicle to perform projection in the vehicle, wherein the display instruction comprises a vehicle door unlocking signal of the vehicle and a vehicle door opening signal of the vehicle, wherein the at least one projection device projects an image displayed on at least one seat in the vehicle, and wherein wirelessly controlling the at least one projection device to perform projection in the vehicle comprises:

in response to the display instruction, sending, by the terminal device, a projection start instruction to the vehicle, wherein the projection start instruction comprises at least one identifier of the at least one projection device and image information corresponding to each of the at least one projection device;

receiving, by the terminal device, a turn-off instruction, wherein a photographing device indicated by the turn-off instruction comprises a first projection device, and the first projection device is a projection device of the at least one projection device; and wirelessly controlling, by the terminal device, the first projection device to turn off projection of the image on the at least one seat, wherein the turn-off instruction comprises a sensing signal, and the sensing signal indicates a user to sit on the at least one seat of the vehicle.

15. The non-transitory computer-readable storage medium according to claim 14, wherein the wirelessly controlling, by the terminal device, the at least one projection device to perform projection in the vehicle comprises:

wirelessly controlling, by the terminal device, each of the at least one projection device to project a first image.

16. The non-transitory computer-readable storage medium according to claim 15, wherein the operations further comprise:

starting, by the terminal device, timing at a moment at which the terminal device controls the at least one projection device to project the first image; and after the timing reaches a first duration, controlling, by the terminal device, the at least one projection device to project a second image.

17. The non-transitory computer-readable storage medium according to claim 14, wherein the image displayed on the at least one seat in the vehicle comprises an image that alters a visual appearance of the image in response to a user interaction.

18. The non-transitory computer-readable storage medium according to claim 14, wherein the vehicle comprises a plurality of seats and a plurality of projection devices corresponding to the plurality of seats, and wherein wirelessly controlling the at least one projection device to perform projection in the vehicle comprises:

controlling each of the plurality of projection devices to project a respective image on a corresponding one of the plurality of seats.

\* \* \* \* \*